US012142837B2

(12) United States Patent
Yu et al.

(10) Patent No.: US 12,142,837 B2
(45) Date of Patent: Nov. 12, 2024

(54) ULTRA-THIN, GAIN-ENHANCED ANTENNA-ON-CHIP AND METHOD

(71) Applicant: KING ABDULLAH UNIVERSITY OF SCIENCE AND TECHNOLOGY, Thuwal (SA)

(72) Inventors: Yiyang Yu, Thuwal (SA); Zubair Akhter, Thuwal (SA); Atif Shamim, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 59 days.

(21) Appl. No.: 17/850,081

(22) Filed: Jun. 27, 2022

(65) Prior Publication Data

US 2022/0416441 A1 Dec. 29, 2022

Related U.S. Application Data

(60) Provisional application No. 63/216,136, filed on Jun. 29, 2021.

(51) Int. Cl.

*H01Q 21/06* (2006.01)
*H01Q 1/22* (2006.01)
*H01Q 9/04* (2006.01)

(52) U.S. Cl.

CPC ......... *H01Q 21/065* (2013.01); *H01Q 1/2283* (2013.01); *H01Q 9/0414* (2013.01)

(58) Field of Classification Search

CPC .. H01Q 21/065; H01Q 1/2283; H01Q 9/0414; H01Q 15/006; H01Q 15/0086

See application file for complete search history.

(56) References Cited

PUBLICATIONS

Q. Liu, A. J. van den Biggelaar, U. Johannsen, M. C. van Beurden and A. B. Smolders, "On-Chip Metal Tiling for Improving Grounded mm-Wave Antenna-on-Chip Performance in Standard Low-Cost Packaging," in IEEE Transactions on Antennas and Propagation, vol. 68, No. 4, pp. 2638-2645, Apr. 2020 (Year: 2020).*

Babakhani, A., et al., "A 77-GHz Phased-Array Transceiver with On-Chip Antennas in Silicon: Receiver and Antennas," IEEE Journal of Solid-State Circuits, Dec. 2006, vol. 41, No. 12, pp. 2795-2806.

Cheema, H., et al., "The Last Barrier: On-Chip Antennas," IEEE Microwave Magazine, Jan./Feb. 2013, vol. 14, No. 1, pp. 79-91, 2013.

Cook, B.S., et al., "Utilizing Wideband AMC Structures for High-Gain Inkjet-Printed Antennas on Lossy Paper Substrate," IEEE Antennas and Wireless Propagation Letters, Jan. 15, 2013, vol. 12, pp. 76-79.

Hirano, T., et al., "Design of 60 GHz CMOS On-Chip Dipole Antenna with 50 % Radiation Efficiency by Helium-3 Ion Irradiation," in 2015 IEEE Conference on Antenna Measurements & Applications (CAMA), Nov. 30-Dec. 2, 2015, pp. 1-2.

(Continued)

*Primary Examiner* — Dieu Hien T Duong

(74) *Attorney, Agent, or Firm* — PATENT PORTFOLIO BUILDERS PLLC

(57) ABSTRACT

An antenna-on-chip, AoC, system includes a substrate base, an artificial magnetic conductor, AMC, system with embedded guiding structures, EGS, the AMC system being located on the substrate base, and an antenna located onto the AMC system, where the EGS are electrically floating within the AMC system.

11 Claims, 23 Drawing Sheets

(56) References Cited

PUBLICATIONS

Johannsen, U., et al., "Antenna-on-Chip Integration in Mainstream Silicon Semiconductor Technologies," 12th European Conference on Antennas and Propagation (EuCAP 2018), Apr. 9-13, 2018, pp. 1-5.

Karim, R., et al., "Performance-Issues-Mitigation-Techniques for On-Chip-Antennas—Recent Developments in RF, MM-Wave, and Thz Bands With Future Directions," IEEE Access, Dec. 7, 2020, vol. 8, pp. 219577-219610.

Karim, R., et al., "The Potentials, Challenges, and Future Directions of On-Chip-Antennas for Emerging Wireless Applications—A Comprehensive Survey," IEEE Access, Dec. 2, 2019, vol. 7, pp. 173897-173934.

Nafe, M., et al., "Gain-Enhanced On-Chip Folded Dipole Antenna Utilizing Artificial Magnetic Conductor at 94 Ghz," IEEE Antennas and Wireless Propagation Letters, Sep. 5, 2017, vol. 16, pp. 2844-2847.

Seyyed-Esfahlan, M., et al., , "SiGe Process Integrated On-Chip Dipole Antenna on Finite-Size Ground Plane," IEEE Antennas and Wireless Propagation Letters, Sep. 20, 2013, vol. 12, pp. 1260-1263.

Yu, Y., et al., "Ultra-Thin Artificial Magnetic Conductor with Metallic Posts for a 94 GHz On-chip Antenna," in 2021 International Applied Computational Electromagnetics Society Symposium (ACES), Aug. 1-5, 2021, pp. 1-3.

Zhang, H., et al., "Gain Enhancement of Millimeter-Wave On-Chip Antenna Through an Additively Manufactured Functional Package," IEEE Transactions on Antennas and Propagation, Jun. 2020, vol. 68, No. 6, pp. 4344-4353.

* cited by examiner

| | $l_a$ | $l_f$ | $w_a$ | $w_f$ | $w_{gnd}$ | $h_a$ | $g$ |
|---|---|---|---|---|---|---|---|
| Ref. AMC | 213 | 200 | 20 | 50 | 200 | 2.5 | 15 |
| AMC + MP | 200 | 181 | 20 | 50 | 200 | 1.5 | 15 |
| AMC + EGS | 380 | 100 | 10 | 15 | 160 | 1.5 | 25 |

FIG. 6

| | $t_{AMC}$ (μm) | Thickness Reduction | Gain of AoC (dBi) | Radiation Efficiency |
|---|---|---|---|---|
| Ref. AMC | 27 | | 4.5 | 45% |
| AMC + MP | 18 | 33% | 1.2 | 23% |
| AMC + EGS | 16 | 41% | 5.08 | 50% |

FIG. 18A

| | Antenna | Patch | TRS | Ground Plane |
|---|---|---|---|---|
| Ref. AMC | 17.9% | 27.3% | | 9.8% |
| AMC + MP | 27.6% | 36.7% | 12.7% | |
| AMC + EGS | 5.1% | 22% | 4.7% | 18.2% |

FIG. 18B

| Techniques | $t_{AMC}$ (μm) | Measured Gain (dBi) | Incr. in Gain (dB) | η | Incr. in η |
|---|---|---|---|---|---|
| Ground plane underneath Si | 300 | 0.12 | NR | NR | NR |
| Two PRS layers + Ground plane underneath Si | 250 | 0 | 3.3 | 21% (sim) | 10% (sim) |
| Slotted patch + Ground plane above Si | 20 | -1.4 | 8 | NR | NR |
| EGS + Ground plane above Si + No adhesion layers | 16 | 5.85 | 9.15 | 57% | 42% |

FIG. 20

ULTRA-THIN, GAIN-ENHANCED ANTENNA-ON-CHIP AND METHOD

CROSS-REFERENCE TO RELATED APPLICATIONS

This application claims priority to U.S. Provisional Patent Application No. 63/216,136, filed on Jun. 29, 2021, entitled "NOVEL TECHNIQUE FOR ON-CHIP ARTIFICIAL MAGNETIC CONDUCTOR THICKNESS REDUCTION," the disclosure of which is incorporated herein by reference in its entirety.

BACKGROUND

Technical Field

Embodiments of the subject matter disclosed herein generally relate to an antenna-on-chip system, and more particularly, to an ultra-thin, artificial magnetic conductor for gain-enhancement of the antenna-on-chip.

Discussion of the Background

Wireless System-on-Chip (SoC), where all functional modules are integrated on a single chip, has attracted considerable research interest with the advantages of high-level integration, low power consumption, and low cost. Typically, the antenna is the largest part of such a wireless system, and previously it was not feasible to integrate it on the chip due to its large size. Note that in order to integrate a given system on a chip, each component of the system needs to have a height lower than a certain threshold, where the threshold depends on the chosen manufacturing process and the machine that manufactures the system. However, due to the push towards millimeter-wave spectrum, antenna sizes have dropped to the order of millimeters and thus, they become compatible with the typical chip dimensions [1-3]. On the other hand, silicon (Si) based semiconductor technologies, such as the Complementary Metal Oxide Semiconductor (CMOS) process, has come a long way and thus high-frequency circuits and antennas can be realized on a single chip in a compact fashion [4].

Although the size of the mm-wave Antenna-on-Chip (AoC) has become compatible with the typical CMOS chip dimensions, the CMOS stack-up is still not favorable for AoC implementation. This is mainly because of the very conductive Si substrate, which also has a very high permittivity. Further, the embedded metal layers in a very thin silicon dioxide ($SiO_2$) (~10-15 μm) are not very suitable for AoC implementation, particularly for lower GHz frequencies. Around six to nine metal layers are available in the $SiO_2$ with interconnected-vias in a typical CMOS stack-up. The high relative permittivity of Si ($\varepsilon_r$=11.9) attracts most of the antenna fields towards the substrate instead of being radiated in the air. Further, the low resistivity (~10 Ω-cm) of the Si substrate causes the loss of power in the Si substrate as heat. The poor radiation performance of the AoC is due to both the high permittivity and conductivity of the Si substrate. In addition, the Si substrate thickness (300-700 μm) is also electrically large (particularly for mm-wave frequencies). Thus, surface wave modes get excited, which leads to the distortion of the radiation pattern, which is undesired.

To improve the AoC radiation performance, two approaches have been reported extensively in the literature [5-8]. The first one involves incorporating off-chip microwave lenses or superstrates. For instance, in [5], the gain of a 77 GHz on-chip dipole antenna has been boosted by 10 dB through the use of a hemispherical lens. In [6], a high-contrast superstrate has been placed above the AoC, which leads to a boresight gain improvement by 4.5 dB. In a second approach, either the lossy Si substrate is removed underneath the AoC or its properties are modified. For example, in [7], the Si beneath the AoC has been etched through micromachining and a gain of 4 dBi is achieved at 85 GHz. Similarly, in [8], the Si resistivity has been selectively enhanced by Helium-3 ion irradiation, resulting in an improvement in radiation efficiency by 43%.

However, these methods are incompatible with CMOS processes and require complex post-fabrication steps, which not only increases the overall cost, but also adds alignment uncertainty and mechanical stability issues.

Alternatively, the Artificial Magnetic Conductors (AMC) system, which is a metamaterial, can be employed to isolate the substrate and provide constructive reflection for the gain enhancement of the AoC. A conventional implementation of the AMC is to place a ground plane 120 underneath the silicon substrate 122 because of the thickness limitation of the $SiO_2$ layer 124, as shown in FIG. 1A, and to add a periodic structure 121 (e.g., metallic patches) on top of the Si substrate 122. The antenna 110 is then placed on top of the $SiO_2$ layer 124. Such a design was illustrated in [6], where the gain of the 71 GHz on-chip monopole 110 was boosted by 4.1 dB. Nevertheless, in this situation, the AoC cannot be shielded completely from the silicon substrate, and the undesired crosstalk between circuits and antennas still exists.

A better solution is to fully isolate the lossy Si substrate 122 by realizing the AMC ground plane 120 above the Si substrate, as shown in FIG. 1B. However, this is dependent on the available $SiO_2$ thickness, which is typically limited to 10-15 μm and thus not suitable for the full AMC realization inside the $SiO_2$ layer 124, as mentioned above. This design of on-chip AMC with the ground plane above the silicon substrate achieved an improvement of 8.4 dB in gain. However, this implementation was achieved at the expense of a thicker $SiO_2$ layer of 40 μm [9], which is not acceptable for the devices that require a maximum thickness of 18 μm for the $SiO_2$ layer. Nonetheless, contrary to other gain enhancement techniques, on-chip AMC can keep the system compact and provide an inexpensive solution due to its compatibility with the CMOS processes. Thus, the bottleneck of the AMC technology is that it is difficult to fit the AMC in the conventional thin $SiO_2$ layer.

Another issue that affects the efficiency of AoC is the presence of thin adhesion layers (10 nm titanium or chromium) that are employed to provide good adhesion to the main metal layers (copper or gold). The surface resistance of these adhesion layers is large because of the skin effect, and thus, the traditional AoC suffers from undesired ohmic losses.

These two issues related to the AoC, i.e., fitting the AMC in conventional $SiO_2$ thickness to completely isolate lossy Si substrates, and avoiding the ohmic loss due to the adhesion layers, need to be overcome by a new AoC system, which is now discussed.

BRIEF SUMMARY OF THE INVENTION

According to an embodiment, there is an antenna-on-chip, AoC, system that includes a substrate base, an artificial magnetic conductor, AMC, system with embedded guiding structures, EGS, the AMC system being located on the substrate base, and an antenna located onto the AMC system. The EGS are electrically floating within the AMC system.

According to another embodiment, there is an antenna-on-chip, AoC, system that includes a substrate base, an artificial magnetic conductor, AMC, system with embedded metallic poles, MPs, the AMC system being located on the substrate base, and an antenna located onto the AMC system. The MPs are electrically connected to a metallic ground plane of the AMC system.

BRIEF DESCRIPTION OF THE DRAWINGS

For a more complete understanding of the present invention, reference is now made to the following descriptions taken in conjunction with the accompanying drawings, in which:

FIG. 6 illustrates the dimensions of the monopole antenna when backed by the AMC system of FIG. 2 and also of AMC systems including thickness reduction structures;

FIG. 18A illustrates the comparison results on an AMC reference system, the AMC with metallic poles, and the AMC with embedded guiding structures;

FIG. 18B illustrates the conductor loss proportion of each part of the AMC-backed AoC;

FIG. 20 illustrates the comparison results of existing AMC based systems and the AMC with embedded guiding structures.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an AoC implemented with a $SiO_2$ layer having a given thickness. However, the embodiments to be discussed next are not limited to a $SiO_2$ layer or only to the given thickness, but may be applied to other layers having different thicknesses.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a thickness of an AoC system fits the CMOS requirements by using either Metallic Posts (MPs) or Embedded Guiding Structures (EGS) in the $SiO_2$ layer, to force the electromagnetic radiation to take a longer path before being emitted outside the device. An attempt to introduce MPs by employing the vias in the stack-up semiconductor device, thereby reducing the AMC thickness, has been tried by the present inventors in [10], without providing the working principle and comprehensive parametric analysis of the approach. The MPs behave as slow-wave structures, which affect the phase velocity and consequently helps in AMC thickness reduction. Furthermore, another novel thickness reduction structure (TRS), which works the available metal layers into the EGS, is discussed in another embodiment herein. The EGS modifies the path of electric fields inside the AMC, making the AMC look electrically thicker. In contrast, the EGS provides more thickness miniaturization as compared to the MP approach. A 16 μm ultra-thin AMC system is realized with a gain improvement of 9.15 dB as compared to a standalone antenna as discussed later in more detail. During the fabrication of these devices, adhesion layers have been completely omitted so ohmic losses due to them have been avoided, without losing the required adhesion for the main metal layers. The measured AoC gain is one of the highest in the literature that has been achieved without off-chip components or post-fabrication processes. More details about these two approaches are now provided.

Figure 1A:
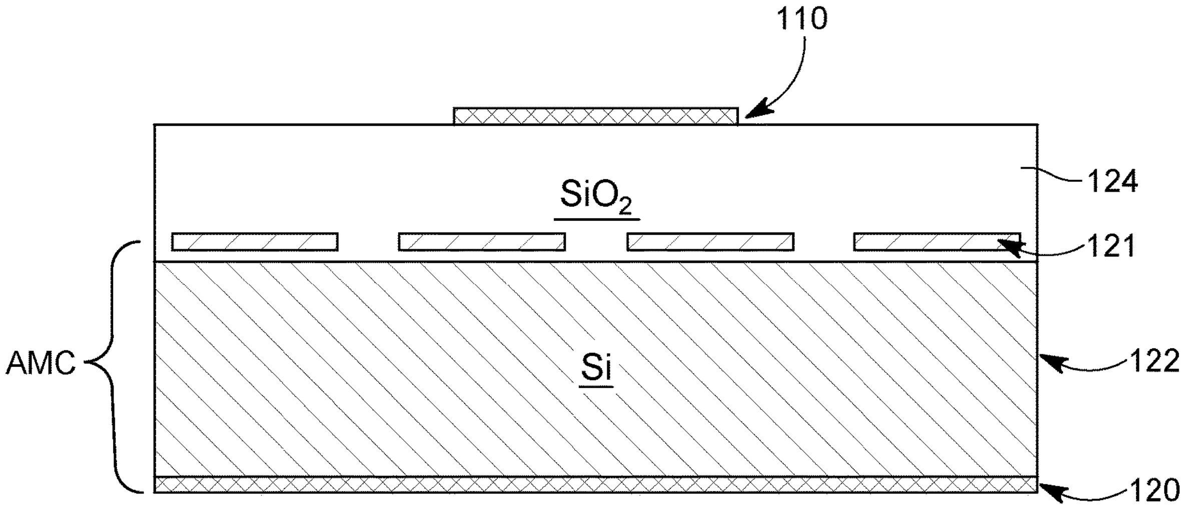
FIG. 1A is a schematic diagram of an AMC based system that has a ground plane located underneath a Si substrate.
Figure 1B:
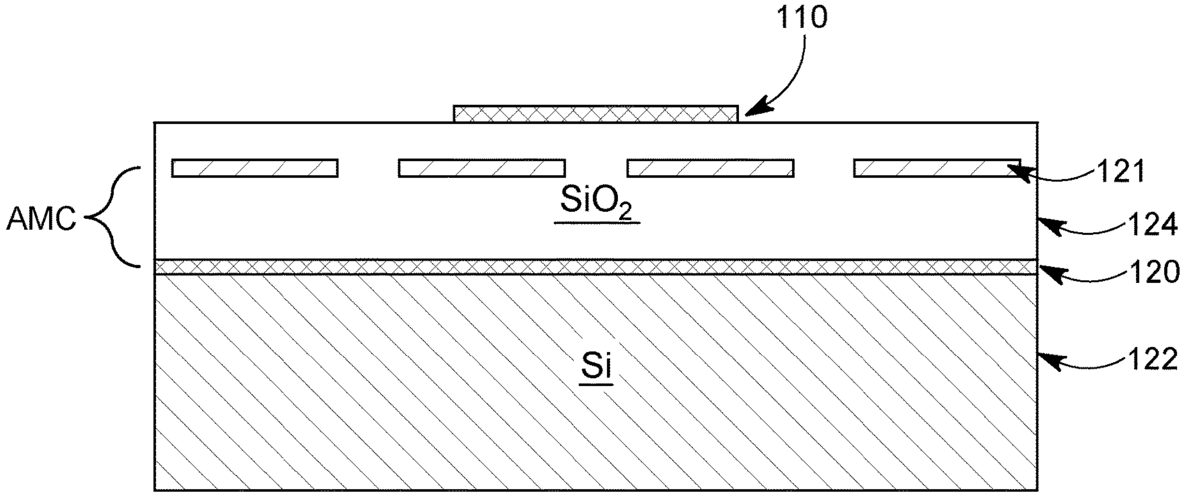
FIG. 1B is a schematic diagram of an AMC based system that has the ground plane located above the Si substrate.
Figure 2:
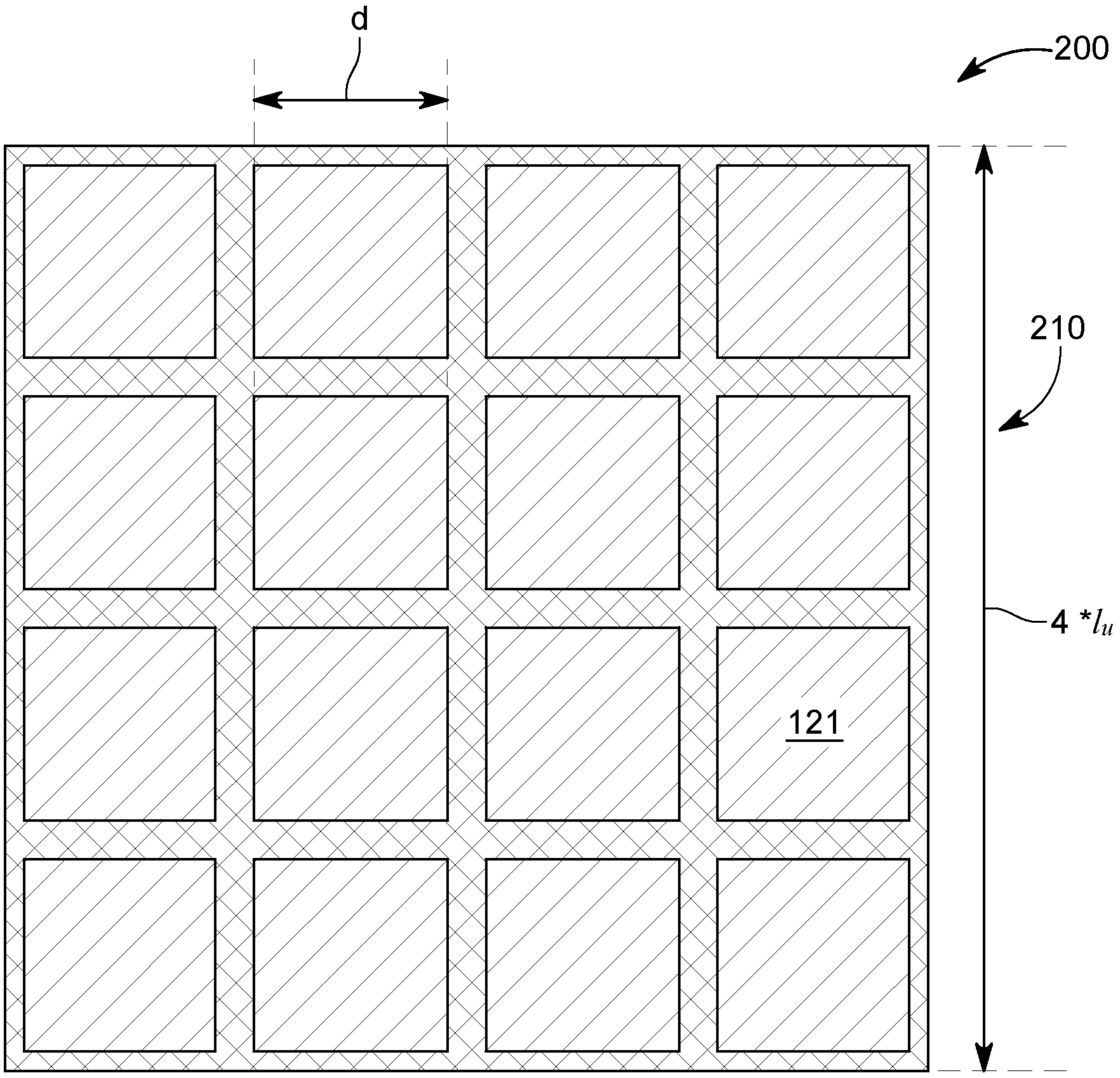
FIG. 2 is a top view of an AMC based system that includes only a ground plane and a plurality of patches.

On-chip antennas are mostly designed to be horizontally placed on the top metal layer of the stack-up (also called "chip," or "semiconductor device" or "AoC system" herein). This is because the top metal layer allows larger metal thickness, which is beneficial for antenna's performance and also this arrangement enables the antenna to radiate directly into the air. The radiation performance of a horizontally placed antenna could be enhanced by a Perfect Magnetic Conductor (PMC) surface that can produce an image current in the same direction. Since the PMC surfaces do not exist in nature, AMC surfaces are developed to mimic the effect of the PMC for a certain frequency range. As discussed above with regard to FIGS. 1A and 1B, a conventional AMC system includes three layers: a periodic metallic layer 121, a dielectric slab 124, and a ground plane 120. The square patch-based AMC system 200 is one of the most commonly used structures, which demonstrates a low return loss and wide operating bandwidth [11]. Thus, a square patch network 210 based AMC system 200 is selected as a reference system for the investigation of the MP and EGS based systems, and this reference system 200 is illustrated in FIG. 2. Note that the square patch network 210 is shown in this figure to have 16 patches 121, each being a square and each having a side of length $l_u$. Throughout this disclosure, the FEM-based 3-D full-wave electromagnetic (EM) solver, and the ANSYS High Frequency Structure Simulator (HFSS) have been used for simulations.

Figure 3:
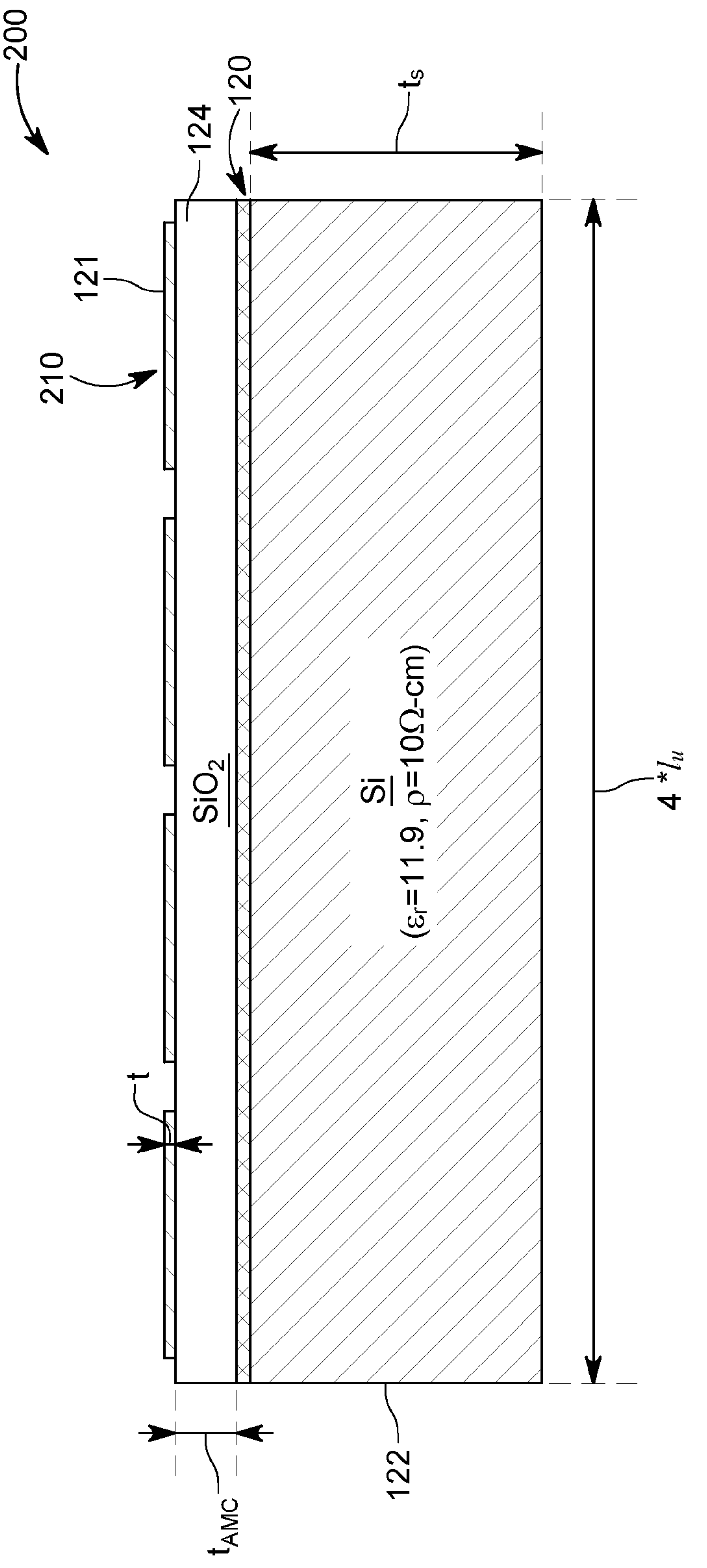
FIG. 3 is a cross-section view of the AMC based system of FIG. 2.
Figure 4:
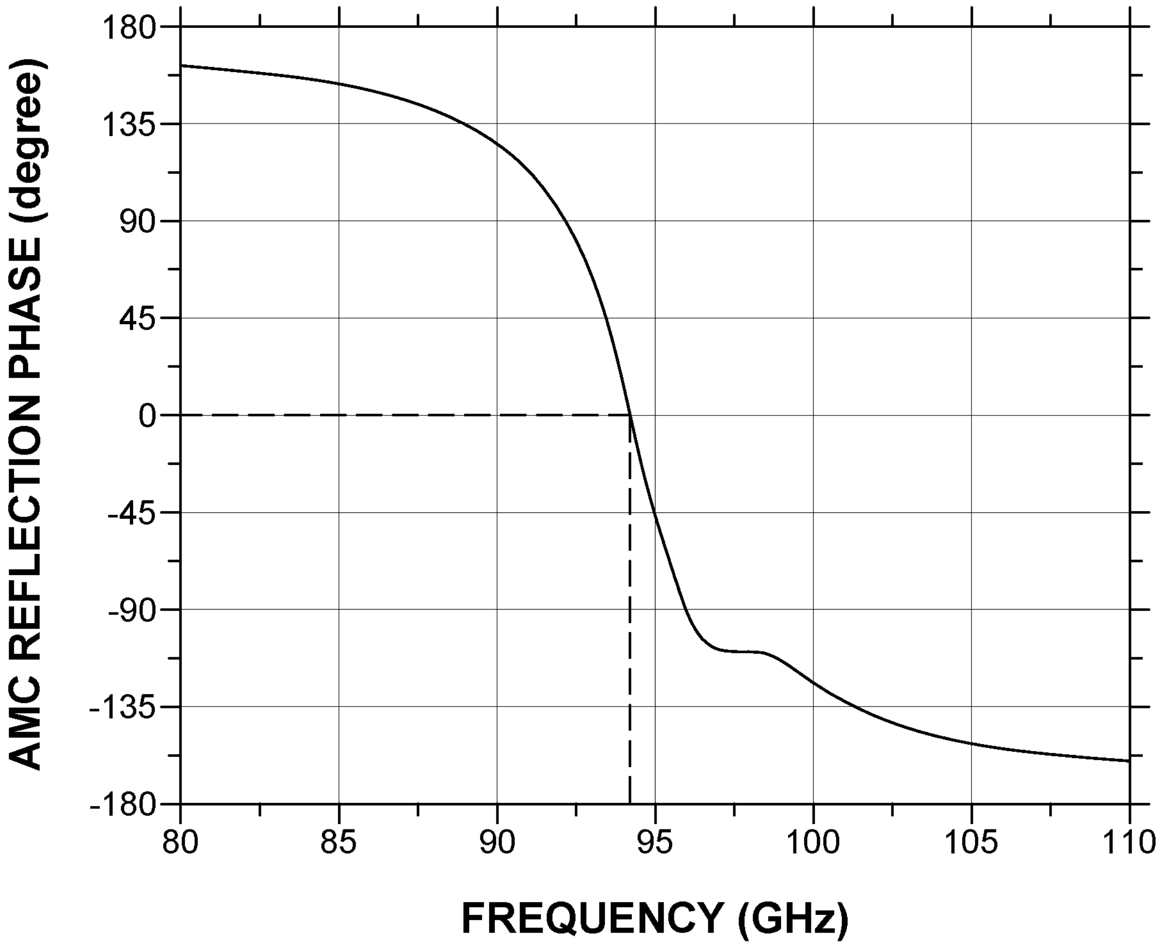
FIG. 4 illustrates the reflection phase of the AMC based system of FIG. 2.

To isolate the silicon substrate 122 completely from the antenna, the ground plane 120 of the AMC system is located on the top of the silicon substrate 122, as shown in FIG. 3. The $SiO_2$ layer 124, which is formed on top of the ground plane 120, has a dielectric constant of 4.0 and houses the periodic square patch metallic layer 210. The metal layers 210 are modelled by copper with a conductivity of $5.8\times10^7$ S/m. Besides, considering a chip with acceptable dimensions, the reference AMC system is simulated as a 4×4 finite surface, as shown in FIG. 2. Except for the AMC's thickness $t_{AMC}$, the other geometrical parameters are fixed for further investigation. According to the simulated result, which is shown in FIG. 4, the reflection phase of the AMC crosses zero degrees at 94 GHz when the AMC thickness becomes 27 μm.

Figure 5A:
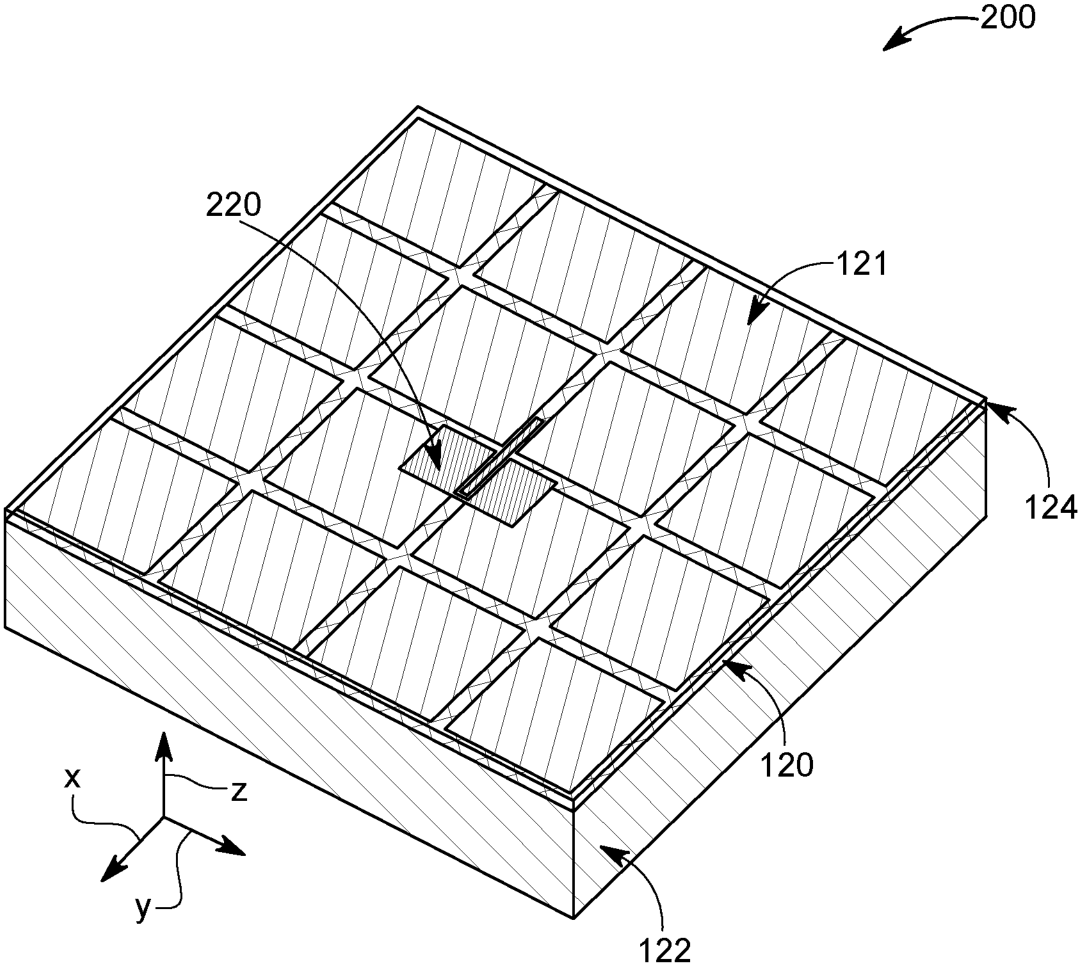
FIGS. 5A to 5C illustrate the AMC based system of FIG. 2 with a monopole antenna.
Figure 5B:
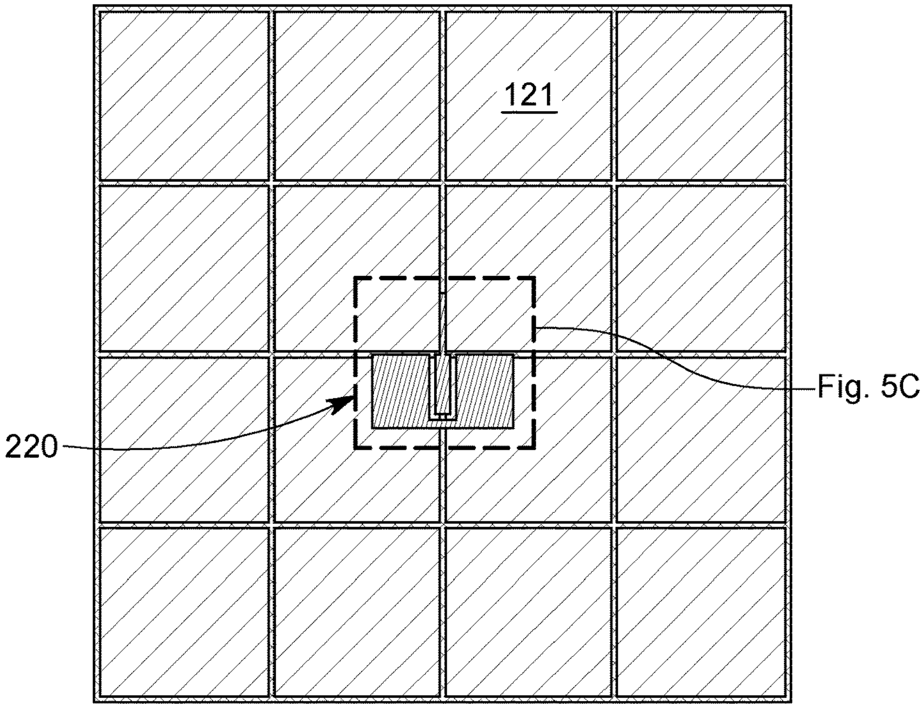
Figure 5C:
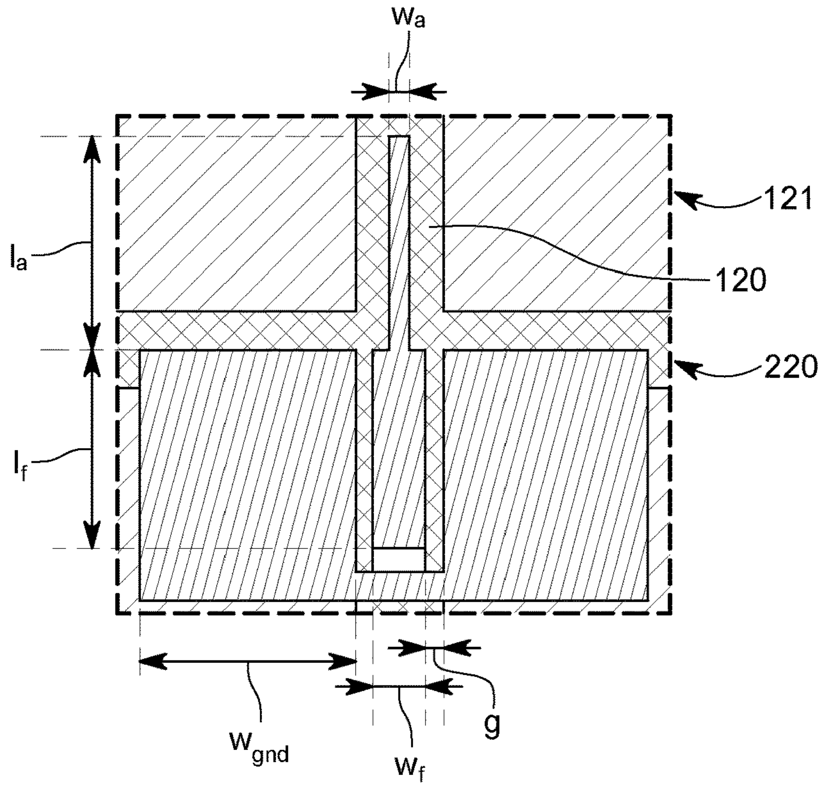
Figure 7A:
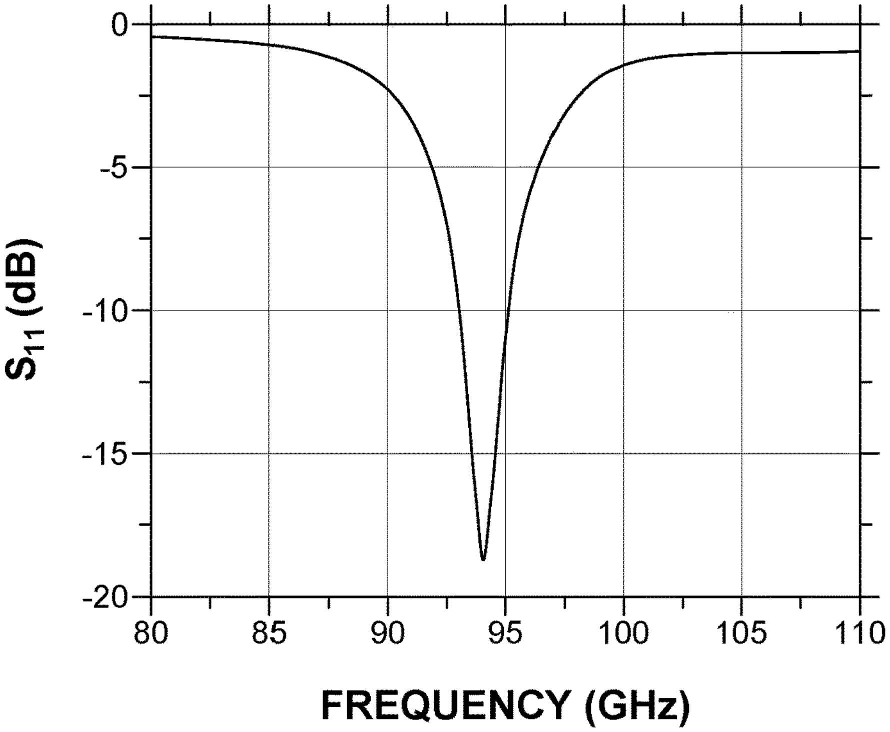
FIG. 7A presents simulated $S_{11}$ results for the monopole antenna backed by the reference AMC system of FIG. 2.
Figure 7B:
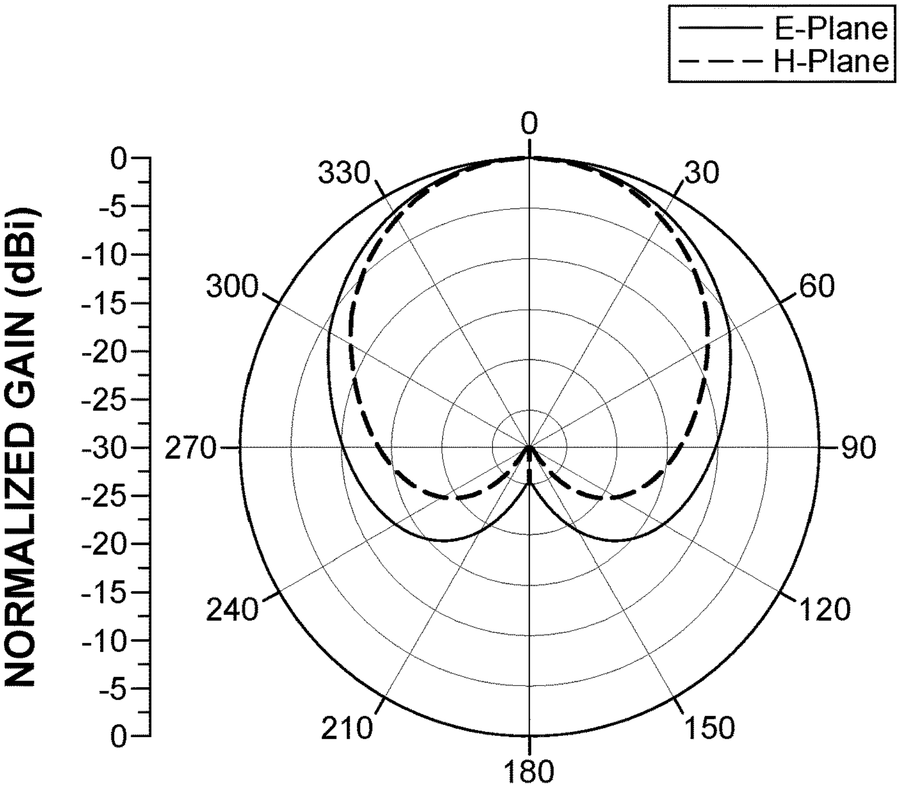
FIG. 7B presents the normalized radiation pattern in the E-plane and H-plane for the same reference system.

To determine the reflection and isolation performance of the reference AMC system 200, a planar monopole antenna 220 is placed on top of the AMC 200, as shown in FIGS. 5A to 5C. To test the antenna 220 with a probe, the antenna is fed by a coplanar waveguide (CPW). The AoC dimensions are given in Table I in FIG. 6 for the reference AMC system 200 and for two new systems that are discussed later. According to the simulated results shown in FIGS. 7A and 7B, the antenna is well-matched at 94 GHz with a return loss of 18.8 dB. These figures demonstrate boresight radiation with a gain of 4.5 dBi and radiation efficiency of 45% at 94 GHz due to the in-phase reflection provided by the reference AMC system.

For the AMC system to work properly at 94 GHz, a $SiO_2$ layer thickness of 27 μm is required, as has been previously determined through EM simulations. This thickness requirement is too high for the stack-up of current CMOS processes as a thickness of only 18 μm is permitted. Therefore, thickness miniaturization techniques need to be introduced in the AMC system design to reach an acceptable oxide thickness, i.e., less than 18 μm. Two kinds of thickness reduction structures (TRS) are introduced now and investigated for a single AMC unit cell as well as the 4×4 finite AMC-backed AoC system.

Figure 8A:
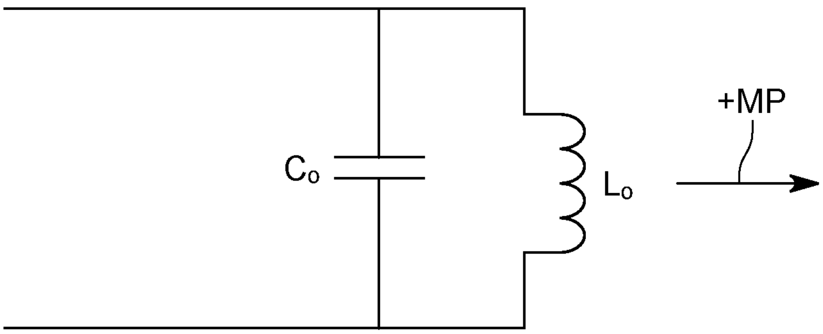
FIG. 8A illustrates the equivalent electrical scheme of the reference AMC system of FIG. 2.
Figure 8B:
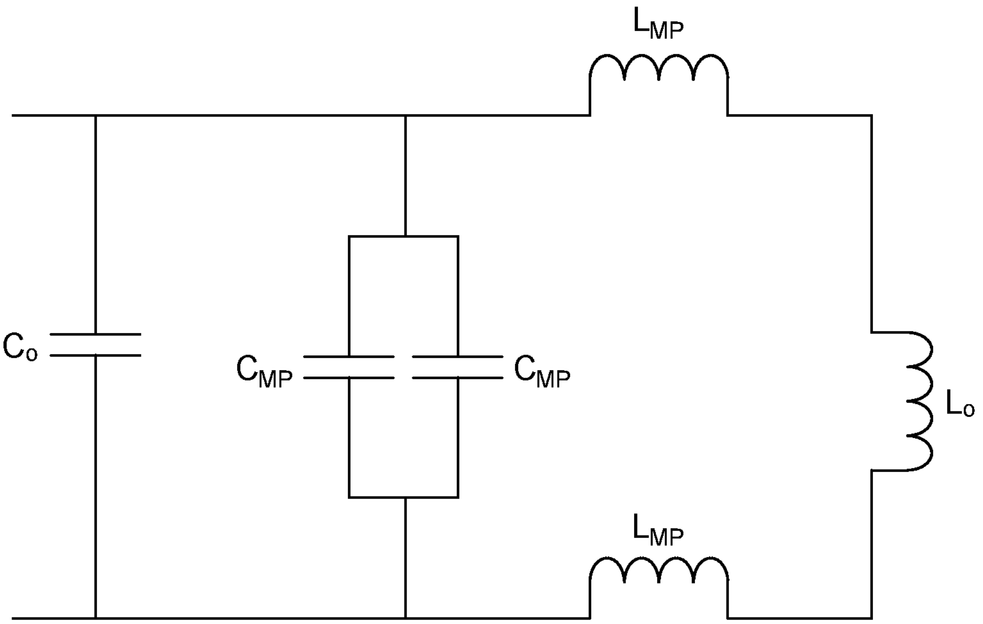
FIG. 8B illustrates the equivalent electrical scheme of an AMC system with metallic poles.

The first TRS structure uses the MPs embedded into the $SiO_2$ layer 124. For a conventional patch-based AMC system, the equivalent model includes a capacitance $C_o$ with a shunt inductance $L_o$, where the $C_o$ is the capacitance between adjacent patches, while $L_o$ refers to the inductor due to the backside ground plane, as shown in FIG. 8A. Inspired by slow-wave structures, the vias available in the oxide layer 124 can be utilized to form MP. Thus, additional series inductors LMP and shunt capacitors CMP can be introduced, where LMP is related to its height, and CMP is the capacitance between the patch and the MP top surface. An electrical schematic of such a structure is illustrated in FIG. 8B. The phase velocity $v_p$ of the waves propagating between the patch and the ground plane is inversely correlated with the additional reactance as given in equation (1):

$$v_p \approx \frac{1}{\sqrt{2L_{MP}\cdot 2C_{MP}}}. \tag{1}$$

Figure 9A:
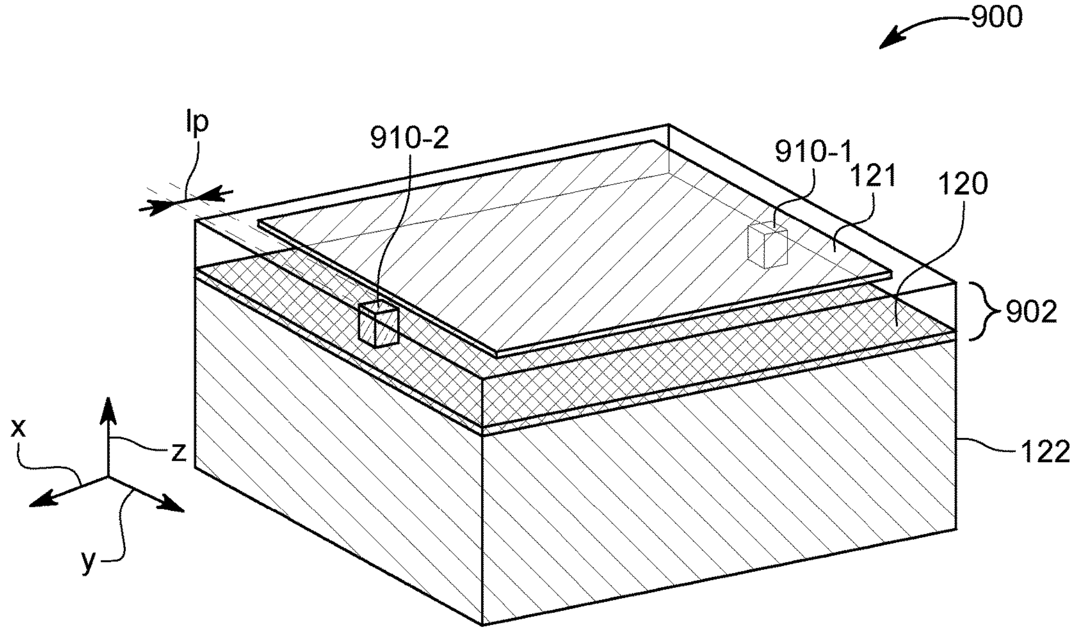
FIG. 9A is an overview of an AMC system having metallic poles for reducing a thickness of the system.
Figure 9B:
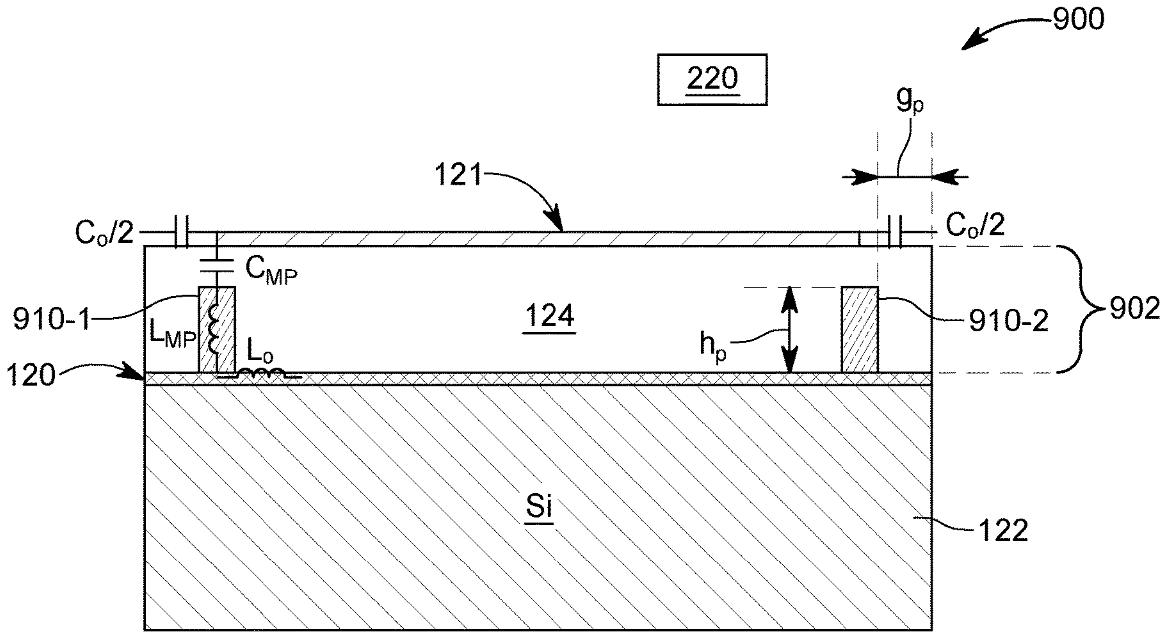
FIG. 9B is a cross-sectional view of the same system.

Through this additional reactance, the phase velocity is reduced, and equivalently, the electrical thickness of the AMC structure is increased. Considering the ohmic losses proportional to the metal volume in each AoC system, the loss resistance would be quite large if too many vias are introduced. Therefore, in an AoC system 900 design, two vias that originate from the ground plane, but are not connected with the patch, are used to form the MPs 910-1 and 910-2 shown in FIGS. 9A and 9B. It is noted that the monopole antenna in FIG. 5A has the radiating arm in the x-direction, resulting in the electric fields excited in the AMC system mainly varying along the x-direction. Therefore, the two MPs 910-1 and 910-2 are placed along the x-direction, symmetrically, with a distance of $g_p$ from the near side unit edge of the ground plane 120, as shown in FIGS. 9A and 9B. Note that the MPs 910-1 and 910-2, together with the ground electrode 120 and the patches 121 form the AMC system 902. The value of $g_p$ can be selected so that the two MPs are fully under the corresponding patch 121, or only partially under it.

The effect of the geometrical parameters of the metallic posts 910-1 and 910-2 on the AMC system's resonance frequency $f_{AMC}$ was conducted to achieve the best results. Typically, the via size (diameter if the via is cylindrical or a side if a square) $l_p$ is often a fixed value, but the degrees of freedom for its design are its height, $h_p$, and its location, $g_p$ on the surface of the ground plane 120. Note that the MPs 910-1 and 910-2 are physically and electrically connected to the ground plane 120, but not to the patch 121, and they are shorter than a thickness of the $SiO_2$ layer 124. Also note that the antenna 220 is placed directly on top of the $SiO_2$ layer 124, but not to electrically connect to the MPs. To investigate the effect of these design parameters of the MPs on the AMC system's resonance frequency, the values of $l_p$ and $t_{AMC}$ are fixed as 6.7 and 13 μm respectively.

Figure 10A:
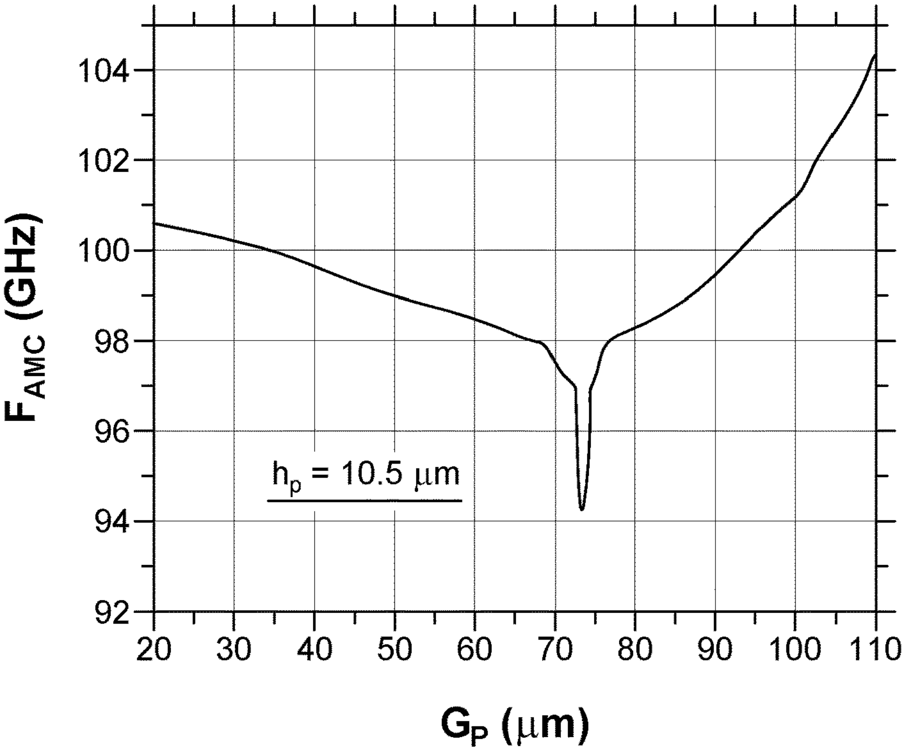
FIG. 10A illustrates the tunning effect of the AMC system with metallic poles when a location of the metallic poles varies.

In FIG. 10A, $g_p$ varies from 20 to 110 μm, while $h_p$ is fixed as 10.5 μm. It is found that the frequency $f_{AMC}$ decreases gradually until $g_p$ reaches 70 μm, with a sharp depression at $g_p$=73 μm, after which it starts to increase. It was found that the current on the patch 121 is mainly distributed along the upper and lower side edges, which is opposite to the situation of the current in the ground plane. This can be explained as follows. When $g_p$ increases, the additional inductance increases significantly, while the capacitance between the patch and the top surface of the posts decreases a little. Thus, the rising inductance dominates in equation (1), which leads to a decreasing frequency $f_{AMC}$. However, when $g_p$ becomes larger than 73 μm, the inductance increases slightly, but the capacitance decreases significantly, which means that the decreasing capacitance is dominant in equation (1) and, thus, the resonance frequency rebounds.

Figure 10B:
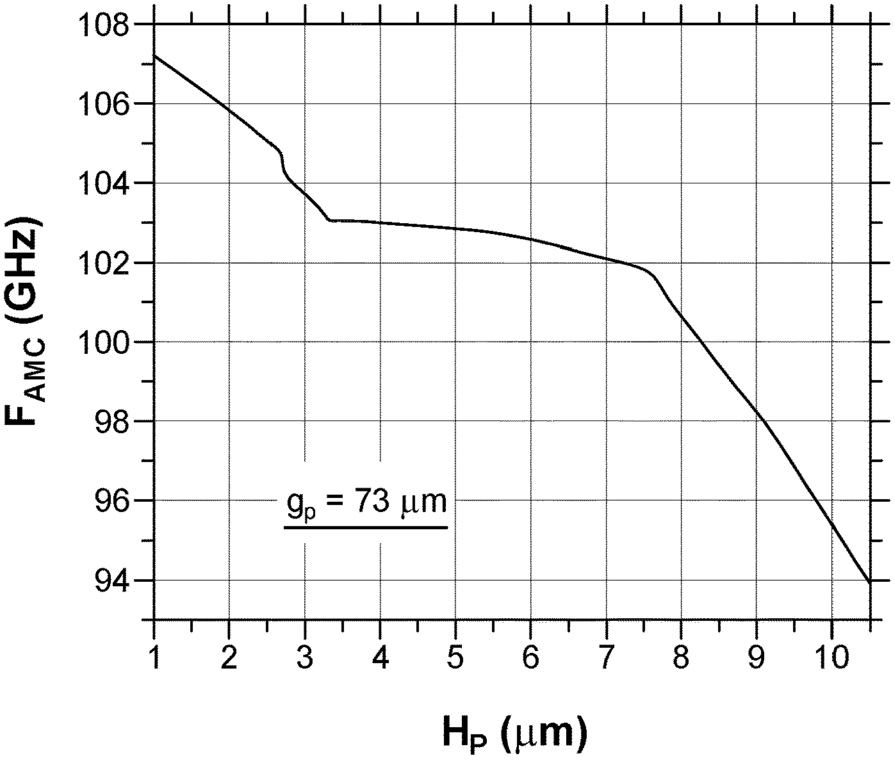
FIG. 10B illustrates the same when the height of the metallic poles varies.

Next, the MP's height $h_p$ is varied from 1 to 10.5 μm while keeping the $g_p$ at 73 μm. The results shown in FIG. 10B illustrate that $f_{AMC}$ demonstrates a constant downward trend when $h_p$ is increased. This is because when $h_p$ increases, the current path is extended and the MP top surface becomes closer to the patch, thus the introduced inductance and capacitance both increase. According to equation (1), the phase velocity and the resonance frequency are both reduced.

From the results of the parametric sweep shown in FIGS. 10A and 10B, it is observed that the MPs can be used to tune the AMC system's resonance frequency. By implanting two MPs in each unit cell of the 4×4 finite patch-based AMC system 902, as illustrated in FIG. 9A, the AMC system can resonate at 94 GHz with a thickness of 18 μm. Compared to the reference AMC system shown in FIG. 5A, the $t_{AMC}$ is reduced by 33%. As reported in [10], the 94 GHz monopole antenna backed by this thin AMC system with the dimensions given in Table I radiates in the boresight direction with a gain of 1.2 dBi and a radiation efficiency of 23%.

Figure 11:
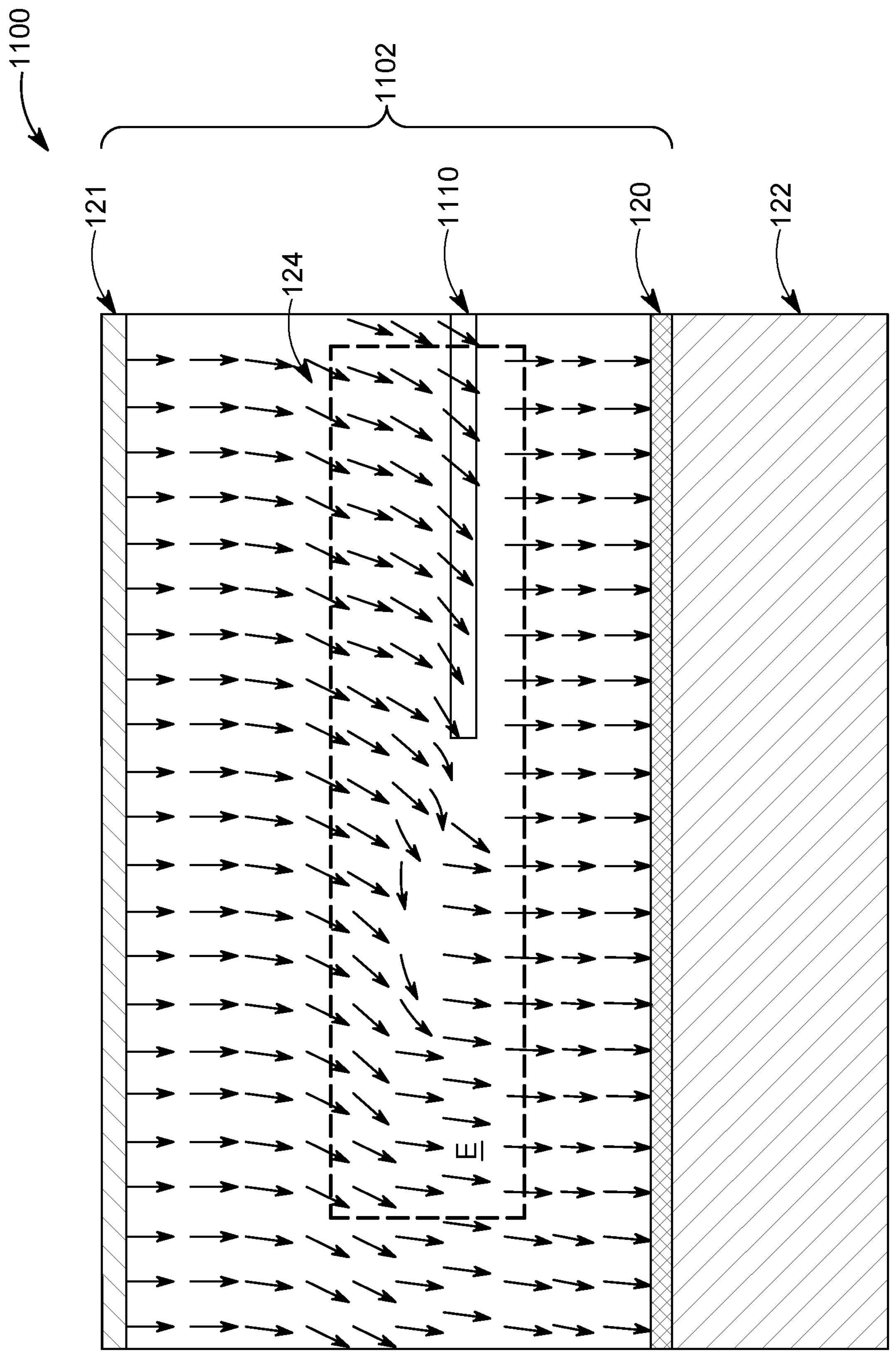
FIG. 11 illustrates the effect on the electric field exerted by an embedded guiding structure into an AMC system.
Figure 12A:
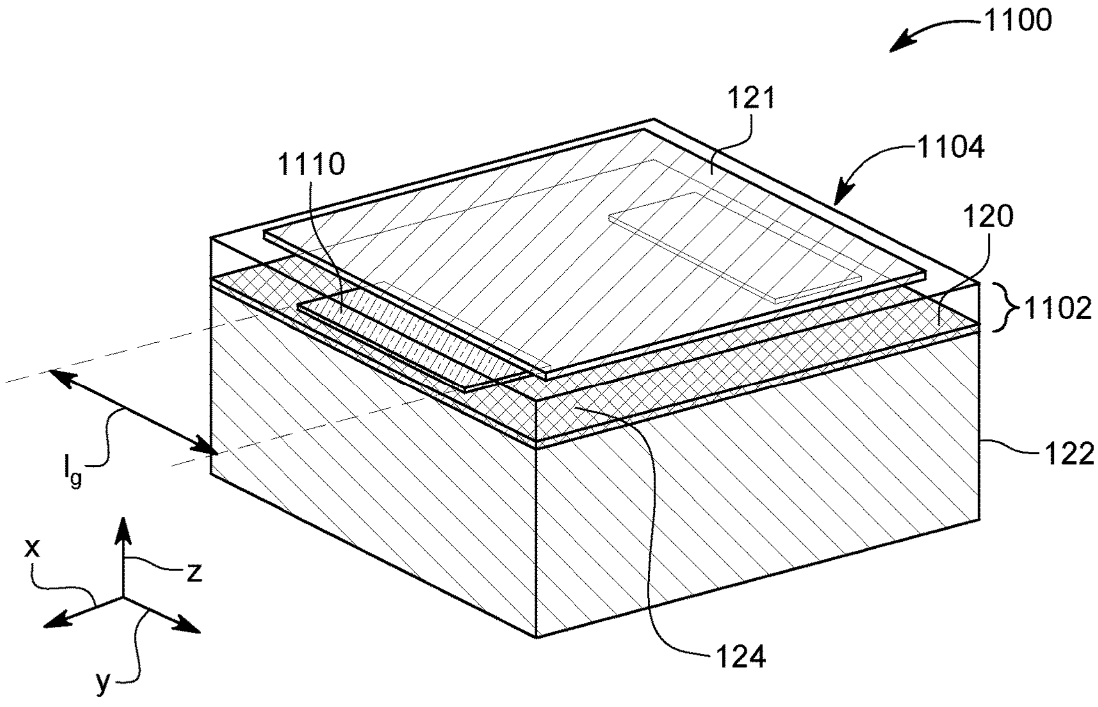
FIG. 12A is an overview of an AMC system with embedded guiding structures and FIG. 12B is a cross-sectional view of the same system.
Figure 12B:
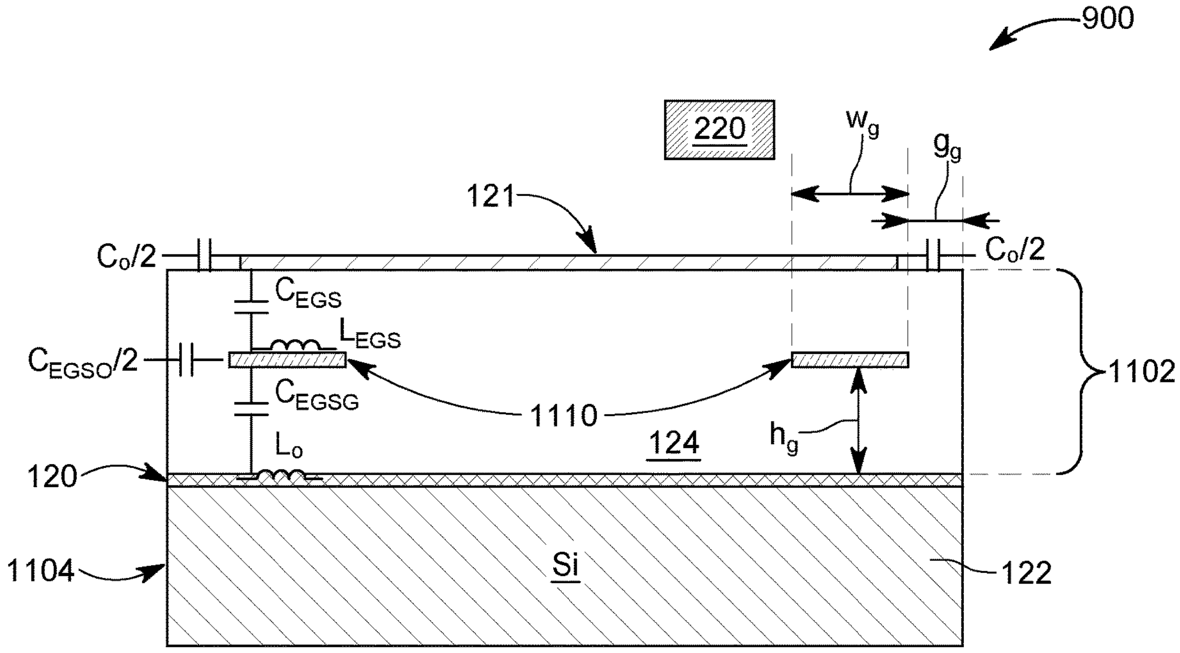
Figure 13:
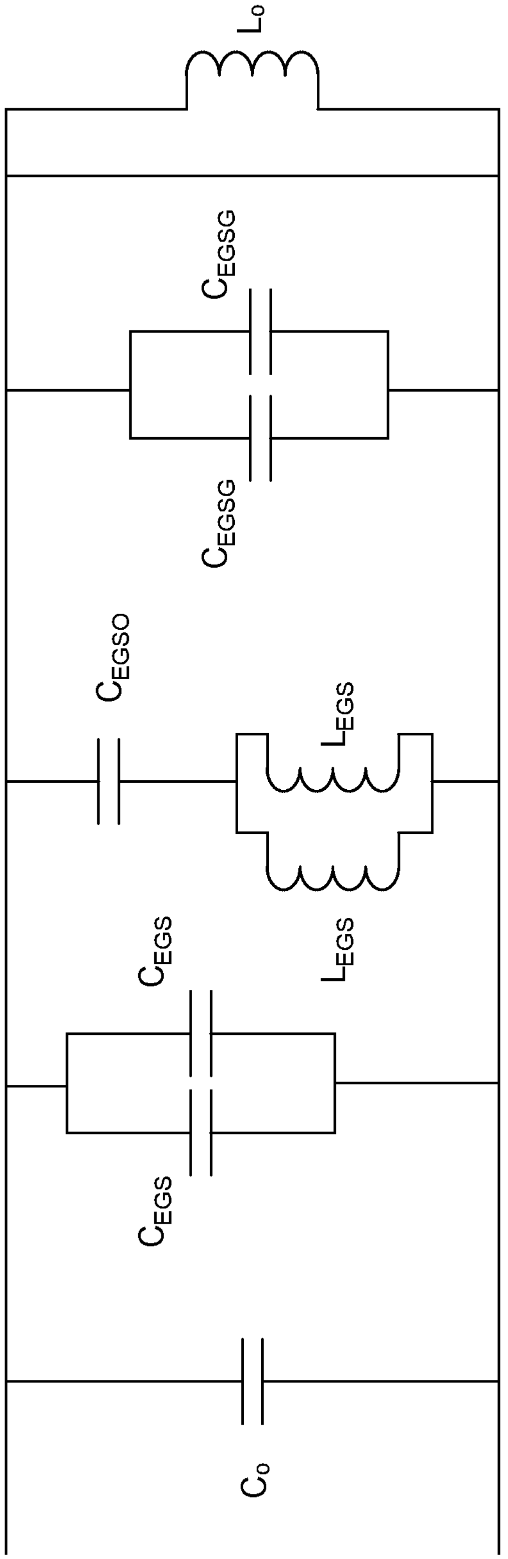
FIG. 13 illustrates the equivalent electrical scheme of the system of FIGS. 12A and 12B.

Next, the approach in which EGS structures are embedded in the $SiO_2$ layer is discussed. The EGS structures, which can be plural planes made of metal, are electrically floating in the $SiO_2$ film, i.e., they are not electrically connected to any element of the semiconductor device. A stack-up 1100 of a standard CMOS process provides about six to nine metal layers inside the oxide layer. These metal layers are embedded in the dielectric part of the AMC system 1102, and can be smartly used to reduce its resonance frequency. As FIG. 11 shows for the AMC system 1102, the electric fields E around the EGS 1110 have to make a detour so that the electrical thickness of the oxide layer 124 appears to be larger. Considering the influence of the resistance, only one metal layer 121 is employed in the AMC system study, as shown in FIGS. 12A and 12B. Similar to the MP based AMC system 902, there are two rectangular symmetric guiding structures 1110 per patch 121 implemented into the AMC system 1102, with planar dimensions of $l_g$ and $w_g$, as illustrated in FIGS. 12A and 12B. The gap between the structures 1110 and the edge of the unit cell 1104 is defined as $g_g$, while $h_g$ refers to the distance of the EGS 1110 to the ground plane 120. The equivalent electrical circuit of a conventional patch-based AMC system is a parallel LC circuit, as shown in FIG. 8A. Because of the addition of the EGS 1110, new distributed capacitors and an inductor, as shown in FIG. 13, are introduced. The capacitance between the EGS 1110 and the patch 121 is defined as $C_{EGS}$; the capacitance between the EGS and the ground plane is $C_{EGSG}$; the capacitance between the EGS of adjacent unit cells 1104 is modelled as $C_{EGSO}$. All introduced capacitances are in parallel with $C_o$ in the equivalent circuit model. The inductor on the EGS, LEGS, appears on the branch of $C_{EGSO}$. The complete equivalent circuit of the AMC system with EGS is shown in FIG. 13. These additional capacitors and inductors provide further flexibility to tune the AMC system's resonance frequency.

To determine the effect of the embedded guiding structure's parameters on the AMC system's thickness reduction, a parametric sweep of each geometrical parameter of the embedded structures is considered. The AMC system thickness $t_{AMC}$ is 13 μm in this embodiment. Considering fabrication limitations of the in-house CMOS-compatible process, the gap between the structures and the unit edge $g_g$ is varied from 5 to 45 μm, the height of the structures $h_g$ is selected from 1 to 10.5 μm, the length of the structures $l_g$ is tuned from 200 to 390 μm, and the width $w_g$ is varied from 50 to 250 μm.

Figure 14A:
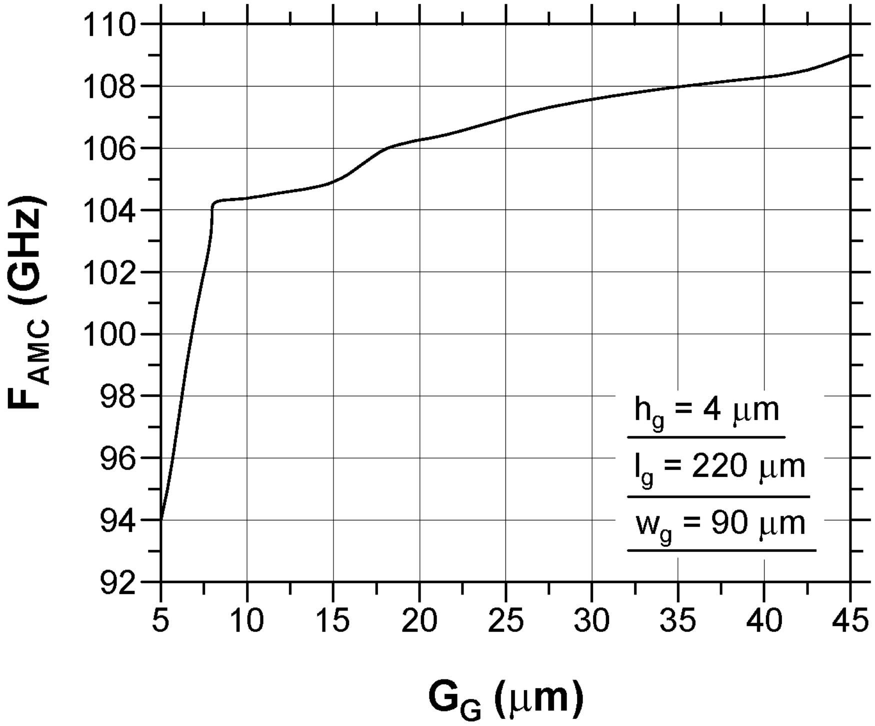
FIGS. 14A to 14D illustrate the variation of the AMC resonance frequency for the system of FIGS. 12A and 12B, when one characteristic of the embedded guiding structures is varying, and all the other characteristics are kept constant.

According to FIG. 14A, the gap $g_g$ is varied while the height, length and width of the EGS 1110 are fixed. It is noted that the resonance frequency is proportional to $g_g$. This is so because the electric fields in the $SiO_2$ layer 124 concentrate around the side edges of the EGS, thus the bending of the electric field path decreases with $g_g$ increasing.

Figure 14B:
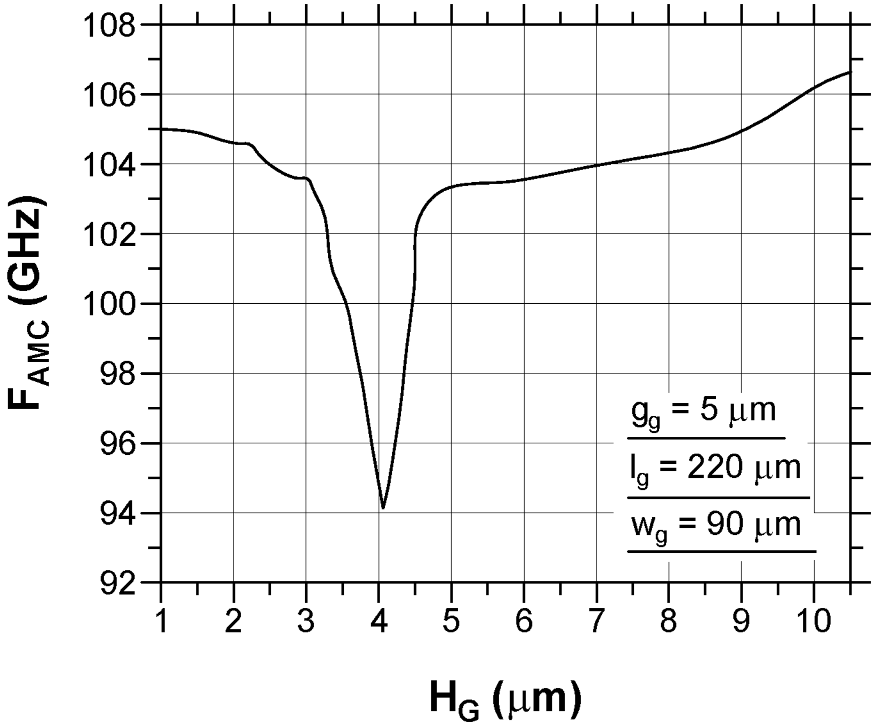

FIG. 14B shows, when $g_g$, $l_g$ and $w_g$ are fixed, the frequency $f_{AMC}$ goes down till the height $h_g$ reaches 4 μm, and then it rebounds. According to the electric field distribution in the $SiO_2$ layer, the fields are stronger near the patch. When $h_g$ increases, more electric fields detour due to the EGS 1110, thus $f_{AMC}$ decreases. However, when EGS is too close to the patch 121, the embedded structures 1110 provide reflection instead of guidance, which is similar to what the ground plane does. It has been observed that the vectors of the electric fields E near the side edge of the EGS 1110, when $h_g$=8 μm, do not detour. To the contrary, the reflection characteristic of the EGS 1110 causes the decrease in the electrical thickness, resulting in the increasing trend of the resonance frequency when $h_g$ is larger than 4 μm.

Figure 14C:
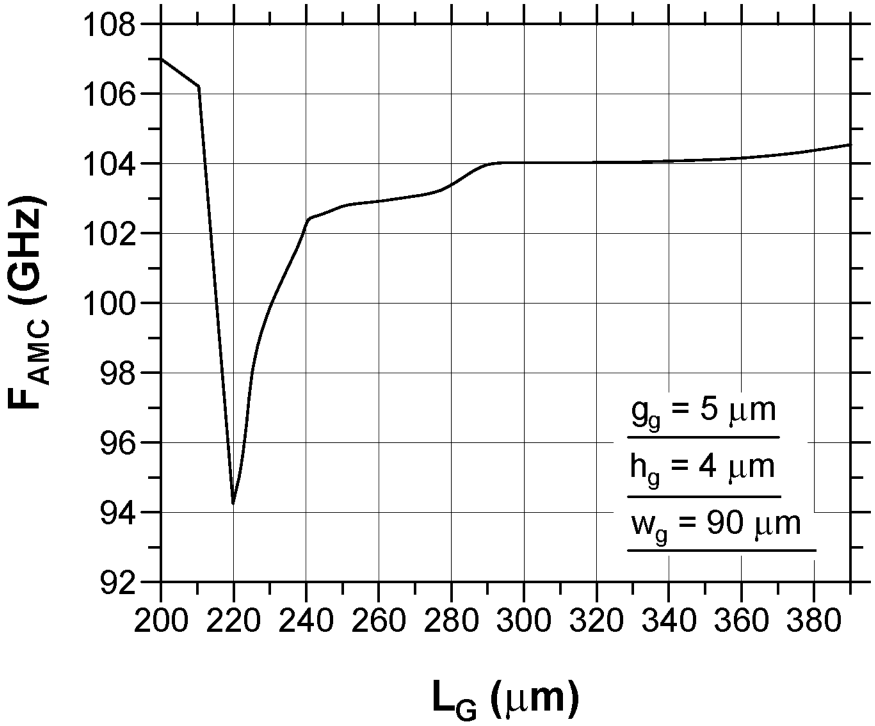
Figure 14D:
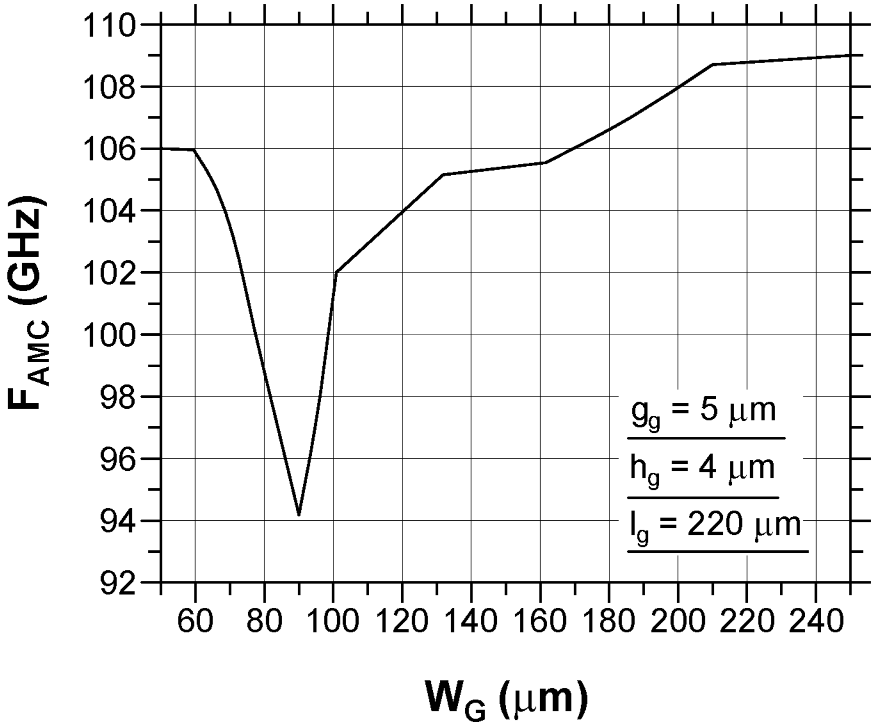

The $f_{AMC}$ in FIGS. 14C and 14D show a sharp decrease and then a rise with the increasing dimensions of $l_g$ and $w_g$, respectively. When the length and width of the structure 1110 is about 220 and 90 μm, respectively, it is observed that the resonance frequency $f_{AMC}$ falls to the lowest level. This is so because the electric fields significantly detour around EGS in this situation and the electrical thickness of the AMC appears to be large. However, when the dimensions of the embedded structures 1110 become too large, e.g., $l_g$=300 μm or $w_g$=180 μm, the detour of the electric fields near the EGS disappears, which causes the rebound of the frequency $f_{AMC}$.

Figure 15A:
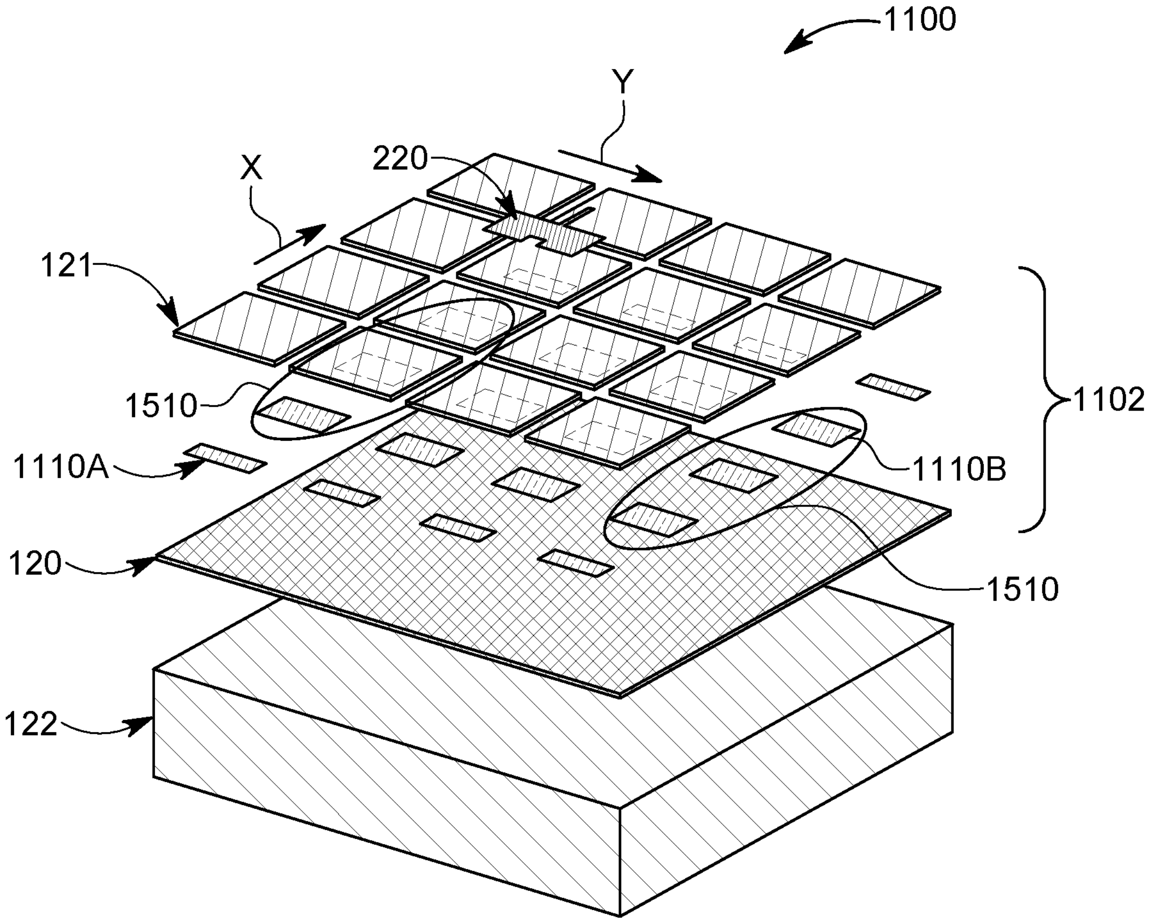
FIG. 15A illustrates an antenna backed with the AMC system having the embedded guiding structures of FIGS. 12A and 12B.
Figure 15B:
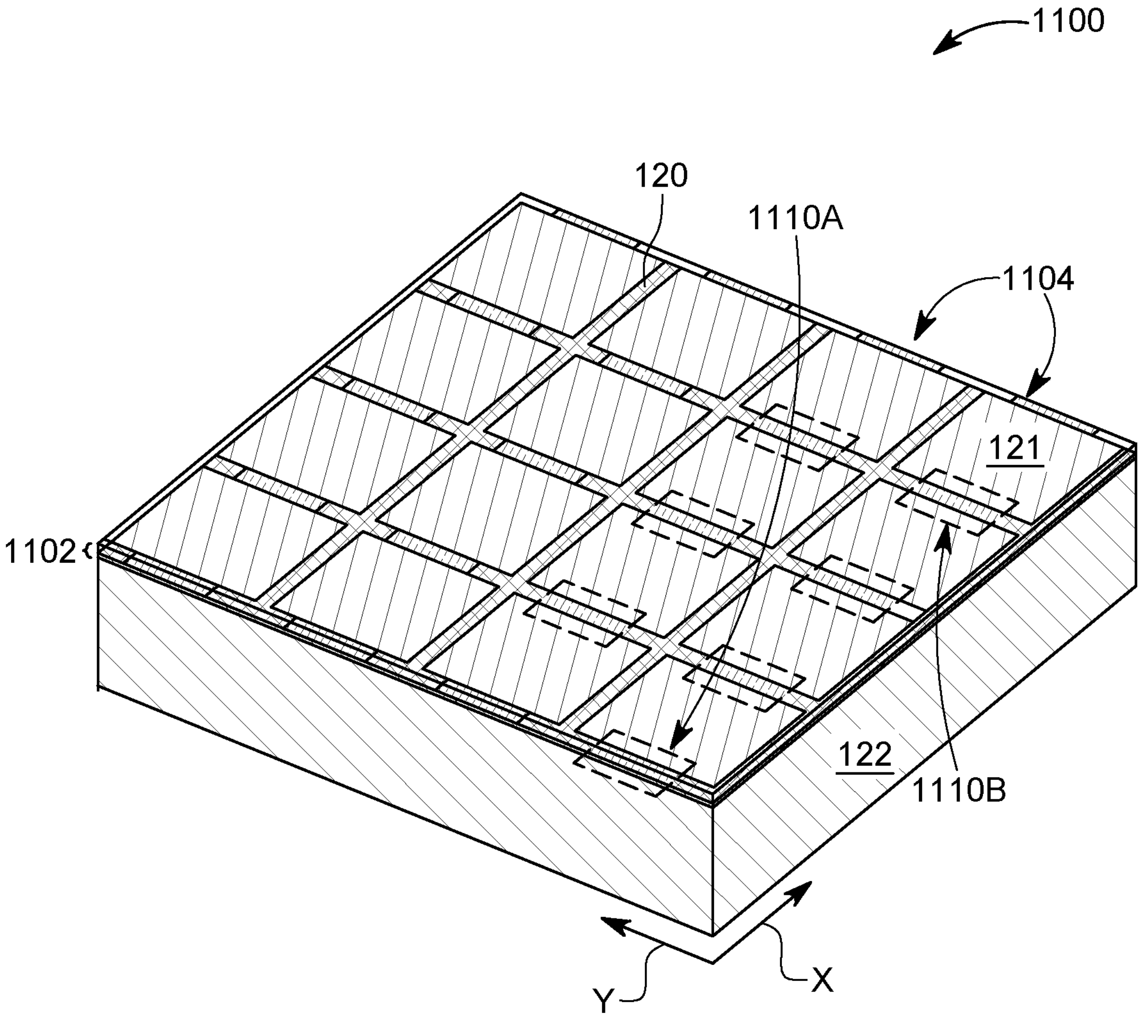
FIG. 15B shows the positions of the embedded guiding structures of the AMC system relative to the patches of the system.
Figure 16:
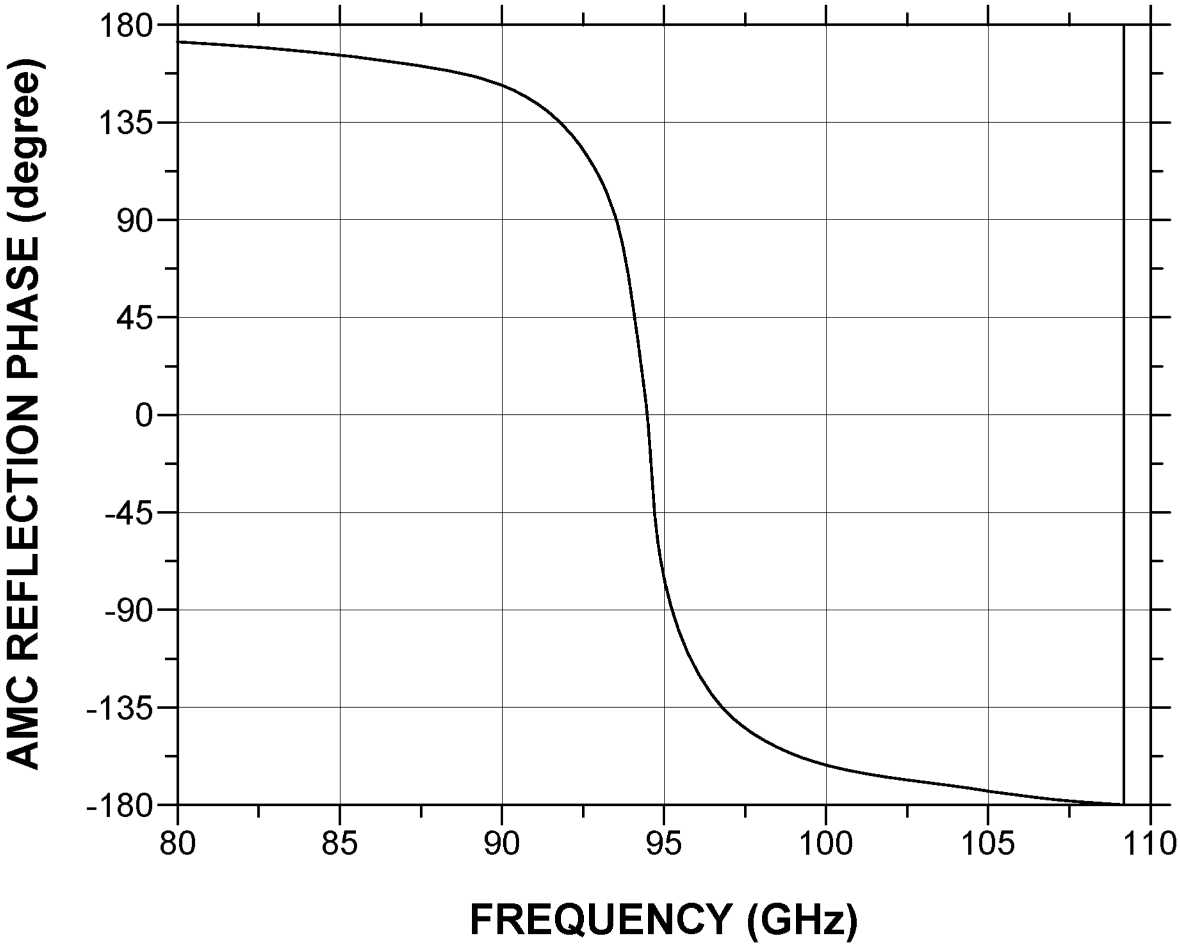
FIG. 16 shows the phase of the reflection coefficient for the system shown in FIGS. 15A and 15B.

The EGS 1110 may be introduced in a 4×4 finite patch-based AMC system 1100, as shown in FIG. 15A, where the edge or peripheral structures 1110A on the chip's edges have a gap $g_g$ away from the edge and dimensions of $l_g$ and $w_g$, while the interior EGS 1110B, which are located between adjacent patches 121, along the x direction, have a length of $l_g$ and width of $2×(g_g+w_g)$. Note that each interior EGS 1110B simultaneously lies underneath two patches 121 along the x direction and underneath a single patch 121 along the y direction, as shown in FIG. 15B. Also note that each EGS is fully embedded in the $SiO_2$ layer. According to FIG. 16, when $g_g$=5 μm, $h_g$=9.5 μm, $l_g$=310 μm, and $w_g$=100 μm, the finite AMC system with EGS has the zero-phase of reflection at 94 GHz, while the oxide thickness of the AMC system with the proposed EGS is only 16 μm, which means a 41% reduction in thickness as compared to the reference AMC (without EGS).

Figure 17A:
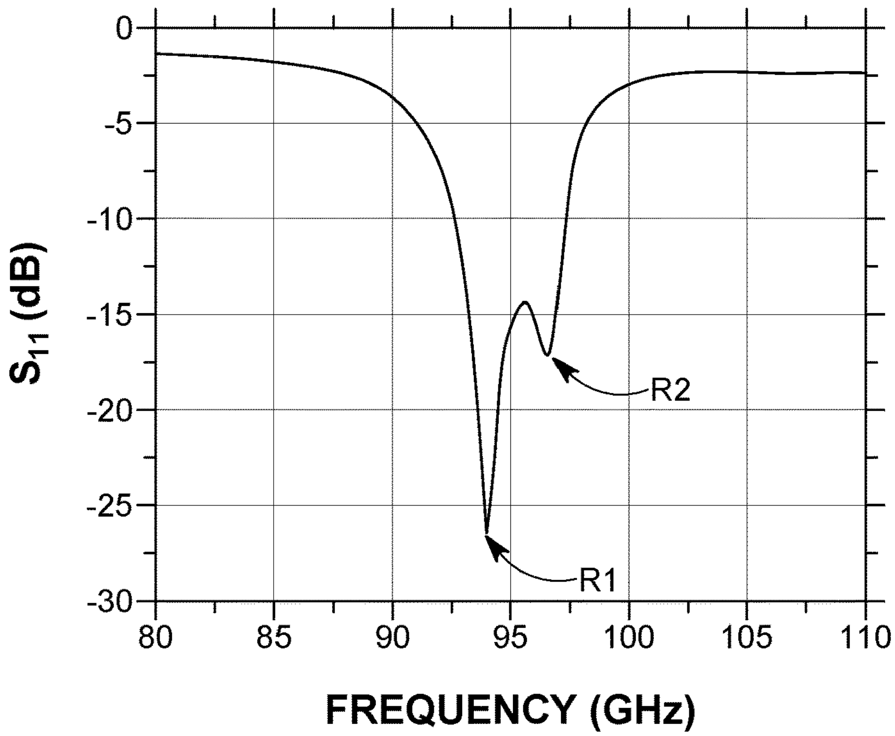
FIG. 17A illustrates a simulated $S_{11}$ factor of the AMC with embedded guiding structures backed monopole antenna and FIG. 17B illustrates the normalized radiation pattern for the same system.
Figure 17B:
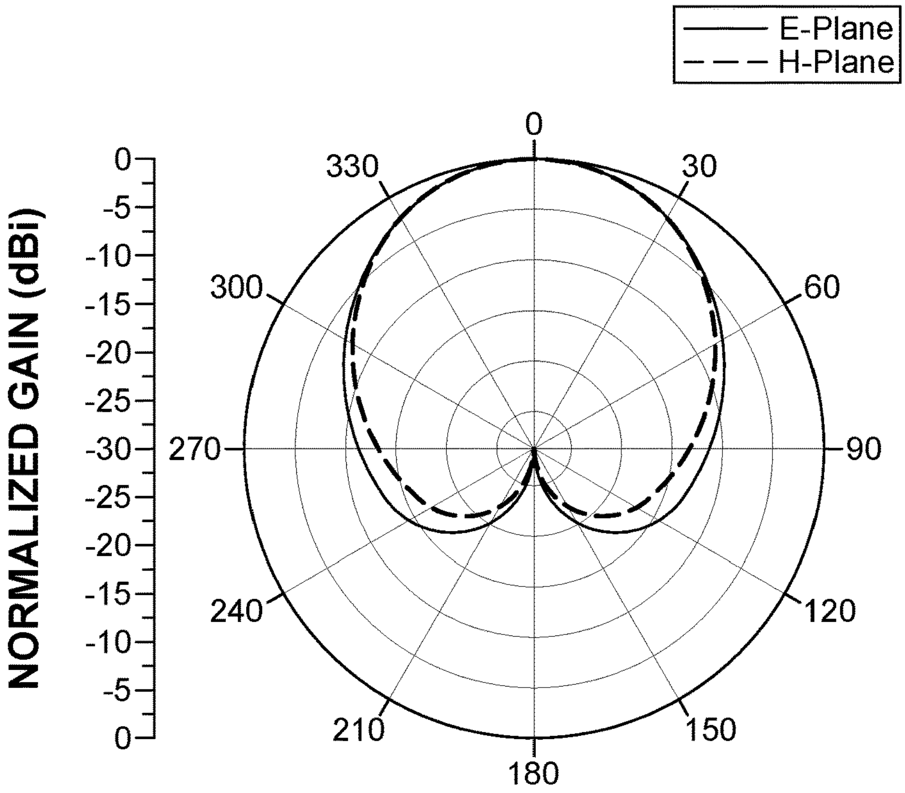

A monopole antenna 220 has been placed above the AMC with EGS system 1102, as shown in FIG. 15A. The AMC system 1102 has a good impedance matching at 94 GHz with a return loss better than 25 dB, while it provides a boresight gain of 5.08 dBi with a radiation efficiency of 50%, as illustrated in FIGS. 17A and 17B. FIG. 17A shows that another resonance R2, in addition to the original resonance R1, appears at 96.5 GHz. This is caused by the EGS 1110 on the left and right edges, shown in the regions 1510 in FIG.

15A. To confirm the origin of the second resonance R2, the lengths and widths of the EGS 1110 in the regions 1510 in FIG. 15A, have been varied by 20 and 4 μm respectively, while the other EGS dimensions were not changed. The results of these simulations confirm that the second resonance shifts by 1 and 0.8 GHz respectively, but there is no change in the main resonance at 94 GHz. The radiation pattern shown in FIG. 17B is for the 94 GHz band as that is the resonant frequency of the radiator.

Conventionally, the vias in the chip are used to connect multiple metal layers in the CMOS stack-up. However, in these embodiments, the vias and metal layers have been utilized to reduce the thickness of the AMC system and not to transfer data or signals among the various components of the semiconductor device. Two finite AMC structures implemented with different TRS (see AMC system 902 in FIG. 9B and AMC system 1102 in FIG. 12B) have been proposed in the previous embodiments. In a standard CMOS process, the designer must carefully follow the foundry rules, typically called design rule check (DRC). For example, rules such as metal width, spacing between two conductors, thickness of the silicon oxide layer, etc. must be strictly followed in order to qualify for fabricating the design in a particular foundry. Among others, these rules require a thickness of the $SiO_2$ layer to be about 18 μm.

To compare the AMC systems discussed above, an identical monopole antenna 220 was placed 2.5 μm above the AMC systems with MP 902 and EGS 1102, respectively. Table II in FIG. 18A summarizes the AMC thicknesses and radiation performance. It is noted that the implementation of EGS within the AMC system leads to a greater reduction in thickness. The monopole antenna 220 integrated with the EGS based AMC system 1102 shows a higher gain and radiation efficiency (5.08 dBi and 50%). The antenna backed by the MP based AMC system 902 has a relatively low gain, due to the undesired high conductor loss. Using the HFSS field calculator, the power loss analysis of the MP based AMC system 902 is performed for a fixed input power of 1 W, and conductor loss for each element is listed in Table III of FIG. 18B. It is noted that when the AMC system is integrated with MPs, a larger proportion of the energy is thermally lost in the antenna, thus the radiation performance of this design is inferior to the AMC system with EGS.

Compared to the reference AMC system (shown in FIG. 1B), the AMC with EGS system 1102 has the least thickness and offers the best gain. It was observed by the inventors that the peak gain of the on-chip monopole antenna positively correlates with the number of AMC unit cells. When there is no AMC system, the gain of the standalone AoC is about −3.3 dBi and the radiation patterns are distorted. Considering that, typically, the radiation pattern of a CPW-fed planar monopole antenna is symmetric in air, the lossy silicon substrate must be responsible for the slight distortion in the radiation pattern of the standalone antenna. By implementing the AMC system 1102 to isolate the antenna from the silicon substrate, the gain of the AoC improves as the number of AMC unit cells increases, until it saturates when the number of unit cells reaches 16. Hence, the AMC system having a size of 4×4 is selected as a best compromise between the overall chip size and the gain of the antenna.

A method for fabricating the AMC system 1102 without any adhesive layers is now discussed. The on-chip monopole antenna backed by a 4×4 thin AMC with EGS system 1102 is selected for fabrication as it exhibits the highest gain for the thinnest oxide layer. During the deposition of the patterned metal layer, specialized adhesion layers, composed of chromium or titanium, are always used in a typical fabrication process. This is to improve the adhesion of the metals (copper or gold) to the oxide. The usage of the adhesion films helps the buildup of noble metal in device fabrication, but it reduces the average conductivity of metal layers and negatively affects the AMC and antenna radiation. It is noted that when an extremely thin AMC thickness is required, the resistance corresponding to the conductor loss plays a significant role that could affect the zero-degree reflection phase property by causing PEC-like effect in the AMC system. It is observed that a 10 nm chromium film modelled at the lower surface of each copper layer as the adhesion layer, causes the antenna gain to reduce to −24.6 dBi and radiation efficiency to less than 0.1%. To study the effect of the adhesion layer thickness on the AoC radiation, the copper layer is fixed as 500 nm, while the thickness of the chromium adhesion film is varied from 10 to 250 nm. According to the simulated results, the peak gain shows a direct proportionality to the thickness of the chromium film. This is because the surface resistance is inversely proportional to the chromium film thickness when it is much thinner than the skin depth of chromium (595 nm at 94 GHz). Therefore, the conduction loss caused by the adhesion films decreases while the chromium thickness increases. Nevertheless, the gain is still not ideal even if the chromium thickness reaches 250 nm. Therefore, to realize an AoC that exhibits the enhanced gain and radiation performance as proposed in simulations, the adhesion layers need to be omitted, but certain modifications to the fabrication process are required to help the copper layers still bond adequately to the oxide.

Figure 19:
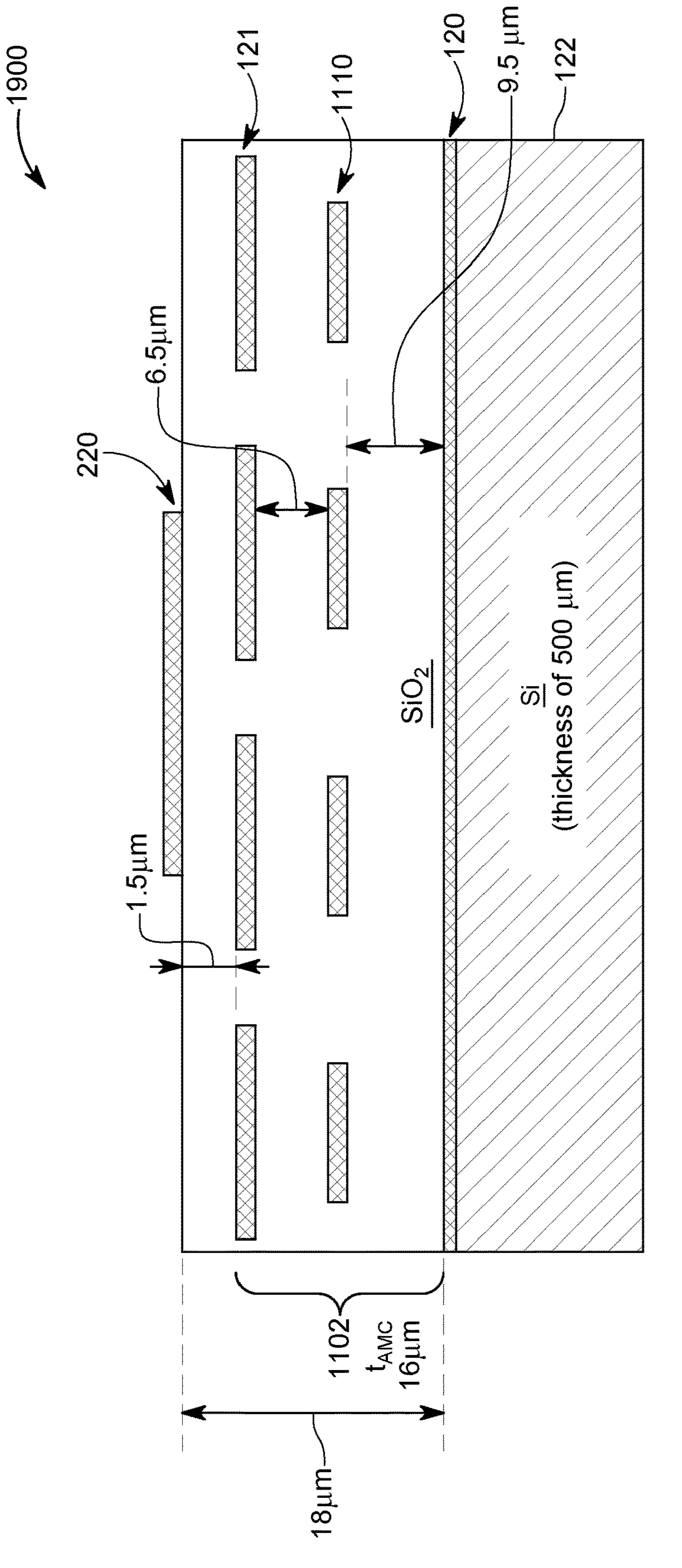
FIG. 19 illustrates an AMC with embedded guiding structures-backed antenna device and associated dimensions of the various components of the device.

An AoC system 1902 including the monopole antenna 220 backed by ultra-thin AMC with EGS system 1102 is depicted in FIG. 19, where the ground plane 120 is supposed to fully cover the substrate 122, the EGS 1110 is designed at 9.5 μm above the ground plane 120, while the periodic patch layer 121 of the finite AMC system 1102 is at a distance of 6.5 μm above the EGS 1110, and the planar monopole antenna 220 is located 1.5 μm above the patch layer 121.

To maintain the copper layer on $SiO_2$ without the adhesion layer deposition, two objectives are considered. On one hand, it is desired to improve the adhesion of the copper to the oxide layer, while on the other hand, during the lift-off step of the lithography, the solvent needs to easily contact the residual photoresist, thereby preventing the patterned copper from exfoliation, which would be caused by conventional intensive ultrasonic lift-off. To achieve these objectives, prior to the lithography step, the bombardment of argon atoms can make the surface of $SiO_2$ rough, thereby enhancing the friction force of the oxide layer to the copper and consequently improving their adhesion. After that, the wafer is coated with AZ 5214 image reversal photoresist whose ideal thickness is 1.6 μm, slightly larger than thrice of the thickness of the copper film. Then, the solidified photoresist is treated by dark-mask-covered exposure and the area, except for the intended pattern, is exposed. Next, the reversal baking with temperature condition (120° C. for two minutes) and flood exposure makes the unexposed intended pattern area developable. After development, such a slanting wall can be found that the lift-off step turns out to be gentle due to the accessibility of the residual photoresist to the solvent.

The input impedance and radiation performance of the system 1902 has been analyzed with a vector network analyzer (VNA). The simulated and measured reflection coefficients of the antenna were found to be in fair agreement for in-band response. It was also found that the on-chip monopole antenna is well matched from 92 to 98 GHz with a return loss of 16 dB at 94 GHz. The radiation performance has been characterized. Due to the physical constraints of the measuring chamber, the E-plane measurement of the antenna ranges from θ=−20° to 230° while φ=−90°, and H-plane is θ=0° to 360° while φ is zero. Generally, the measured curves follow the same trends as the simulated curves. The H-plane pattern is almost matched to the simulated curve except a backside radiated lobe, while there are several additional side lobes measured in the E-plane. The measured peak gain is also in fair agreement with the simulated results, showing an initial rise followed by a drop, in the impedance-matched frequency band (92 to 98 GHz). The highest value of the realized gain occurs at 94 GHz as 5.85 dBi, which is close to the gain value of 5.08 dBi in simulations. The 3 dB gain bandwidth is 5.4%. Furthermore, to characterize the directivity D and radiation efficiency η of the system 1902, the spherical radiation pattern, with the exception of the probe part (φ=−30° to +30°, θ=20° to 130°), has been measured with an azimuth step of 5° and the inclination step of 2°. The directivity has been found to be 8.22 dB and the radiation efficiency is 57%.

Table IV in FIG. 20 shows the gain-enhancement performance comparison between the system 1902 and similar works using AMC for AoC gain enhancement. According to this table, the system 1902 has the thinnest on-chip AMC design and the highest experimentally measured gain of an antenna by using on-chip AMC only (see last row in the table).

The disclosed embodiments provide an AoC system that uses AMC with EGS for reducing the thickness of the AMC such that the AoC is compatible and fits CMOS standards. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] H. M. Cheema and A. Shamim, "The last barrier: on-chip antennas," IEEE Microwave Magazine, vol. 14, no. 1, pp. 79-91, 2013, doi: 10.1109/mmm.2012.2226542.

[2] R. Karim, A. Iftikhar, and R. Ramzan, "Performance-Issues-Mitigation-Techniques for On-Chip-Antennas—Recent Developments in RF, MM-Wave, and Thz Bands With Future Directions," IEEE Access, vol. 8, pp. 219577-219610, 2020, doi: 10.1109/ACCESS.2020.3042928.

[3] R. Karim, A. Iftikhar, B. Ijaz, and I. Ben Mabrouk, "The Potentials, Challenges, and Future Directions of On-Chip-Antennas for Emerging Wireless Applications—A Comprehensive Survey," IEEE Access, vol. 7, pp. 173897-173934, 2019, doi: 10.1109/access.2019.2957073.

[4] U. Johannsen and A. B. Smolders, "Antenna-on-Chip Integration in Mainstream Silicon Semiconductor Technologies," IET Conference Proceedings, pp. 580 (5 pp.)-580 (5 pp.). [Online]. Available: https://digital-library.theiet.org/content/conferences/10.1049/cp.2018.0939.

[5] A. Babakhani, X. Guan, A. Komijani, A. Natarajan, and A. Hajimiri, "A 77-GHz phased-array transceiver with on-chip antennas in silicon: Receiver and antennas," IEEE Journal of Solid-State Circuits, vol. 41, no. 12, pp. 2795-2806, 2006.

[6] H. Zhang and A. Shamim, "Gain enhancement of millimeter-wave on-chip antenna through an additively manufactured functional package," IEEE Transactions on Antennas and Propagation, vol. 68, no. 6, pp. 4344-4353, 2020.

[7] M. Seyyed-Esfahlan, M. Kaynak, B. Göttel, and I. Tekin, "SiGe process integrated on-chip dipole antenna on finite-size ground plane," IEEE Antennas and Wireless Propagation Letters, vol. 12, pp. 1260-1263, 2013.

[8] T. Hirano et al., "Design of 60 GHz CMOS on-chip dipole antenna with 50 radiation efficiency by helium-3 ion irradiation," in 2015 IEEE Conference on Antenna Measurements & Applications (CAMA), 30 Nov.-2 Dec. 2015, pp. 1-2, doi: 10.1109/CAMA.2015.7428176.

[9] M. Nafe, A. Syed, and A. Shamim, "Gain-enhanced on-chip folded dipole antenna utilizing artificial magnetic conductor at 94 GHz," IEEE Antennas and Wireless Propagation Letters, vol. 16, pp. 2844-2847, 2017.

[10] Y. Yu, Z. Akhter, and A. Shamim, "Ultra-Thin Artificial Magnetic Conductor with Metallic Posts for a 94 GHz On-chip Antenna," in 2021 International Applied Computational Electromagnetics Society Symposium (ACES), 1-5 Aug. 2021, pp. 1-3, doi: 10.1109/ACES53325.2021.00181.

[11] B. S. Cook and A. Shamim, "Utilizing Wideband AMC Structures for High-Gain Inkjet-Printed Antennas on Lossy Paper Substrate," IEEE Antennas and Wireless Propagation Letters, vol. 12, pp. 76-79, 2013, doi: 10.1109/LAWP.2013.2240251.

What is claimed is:

1. An antenna-on-chip, (AoC), system comprising:

a substrate base;

an artificial magnetic conductor, (AMC), system with embedded guiding structures, (EGSs), the AMC system being located on the substrate base; and an antenna located onto the AMC system, wherein the EGSs are electrically floating within the AMC system and the EGSs include plural interior EGSs and plural peripheral EGSs, and wherein a peripheral EGS of the plural peripheral EGSs has a width $w_g$ and a gap $g_g$, from an edge of the AoC system, and an interior EGS of the plural interior EGSs has a width proportional to a sum of (1) the width $w_g$ and (2) the gap $g_g$ of the peripheral EGS.

2. The AoC system of claim 1, wherein the AMC system comprises:

a metallic ground plane located on top of the substrate base;

plural patches of metal located above the metallic ground plane; and the EGSs being located between the metallic ground plane, and the plural patches.

3. The AoC system of claim 2, wherein a space defined by the metallic ground plane and the plural patches is filed with an oxide layer.

4. The AoC system of claim 3, wherein the EGSs are fully embedded into the oxide layer.

5. The AoC system of claim 4, wherein the oxide layer is $SiO_2$.

6. The AoC system of claim 2, wherein each of the plural interior EGSs is located to straddle two adjacent patches of the plural patches.

7. The AoC system of claim 6, wherein one of the plural interior EGSs has a length between 200 to 390 μm, and a width between 50 and 250 μm.

8. The AoC system of claim 1, wherein the interior EGS of the plural interior EGSs has the width equal to twice the sum of (1) the width $w_g$ and (2) the gap $g_g$ of the peripheral EGS.

9. The AoC system of claim 2, wherein there are two EGSs of the plural interior EGSs per patch of the plural patches and no adhesion layers.

10. The AoC system of claim 1, wherein a distance between the substrate base and the antenna is about 18 μm, and a thickness of the AMC is about 16 μm.

11. The AoC system of claim 1, wherein each of the EGSs deflects an electrical field generated between a metallic ground plane and the antenna, so that a length experienced by the electrical field is larger than a distance between the metallic ground plane and the antenna.

* * * * *